US011853937B1

(12) United States Patent
Porrata et al.

(10) Patent No.: US 11,853,937 B1
(45) Date of Patent: Dec. 26, 2023

(54) METHOD, APPARATUS AND COMPUTER PROGRAM PRODUCT FOR MONITORING METRICS OF A MATURING ORGANIZATION AND IDENTIFYING ALERT CONDITIONS

(71) Applicant: Wells Fargo Bank, N.A., San Francisco, CA (US)

(72) Inventors: Jose L. Porrata, Charlotte, NC (US); Lisa Bronikowski, Mooresville, NC (US); Gregory Steven Boehm, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 308 days.

(21) Appl. No.: 16/938,319

(22) Filed: Jul. 24, 2020

(51) Int. Cl.
*G06Q 10/0631* (2023.01)
*G06N 20/00* (2019.01)

(52) U.S. Cl.
CPC ....... *G06Q 10/06313* (2013.01); *G06N 20/00* (2019.01); *G06Q 10/06312* (2013.01)

(58) Field of Classification Search
None
See application file for complete search history.

(56) References Cited

U.S. PATENT DOCUMENTS

| | | | | |
|---|---|---|---|---|
| 10,395,189 | B2 * | 8/2019 | Farooq | G06Q 10/06 |
| 10,592,828 | B2 * | 3/2020 | Farooq | G06Q 30/0201 |
| 11,023,831 | B2 * | 6/2021 | Farooq | G06Q 30/0201 |
| 2005/0027550 | A1 * | 2/2005 | Pritchard | G06Q 10/06393 |
| | | | | 705/7.39 |

(Continued)

FOREIGN PATENT DOCUMENTS

| | | | | |
|---|---|---|---|---|
| CA | 2756440 | A1 * | 5/2012 | G06Q 10/06 |
| CA | 2776754 | A1 * | 12/2012 | G06Q 10/06 |

(Continued)

OTHER PUBLICATIONS

Chaşovschi, Carmen. "Human resources management maturity model. Toward a new model." The USV Annals of Economics and Public Administration 11.2 (2012): 143-148. (Year: 2012).*

(Continued)

*Primary Examiner* — Brian M Epstein
*Assistant Examiner* — Derick J Holzmacher
(74) *Attorney, Agent, or Firm* — K&L Gates LLP

(57) ABSTRACT

A method, apparatus and computer program product are provided for providing resource adequacy intelligence information. A user may configure organizational data relating to various levels within an organizational hierarchy. Various assumption data, including quantifiable target developments of an organization, at any level of the hierarchy, may be configured. A monitoring engine monitors actual values of metrics provided by integrating systems, and/or predicted values predicted based on the actual values, relative to target values calculated according to assumption data. Alert conditions relating to metrics, and for any level of the hierarchy may be generated in response to the monitoring and provided via a user interface. Intelligence information relating to workforce needs, location optimization, and real estate needs is also provided.

20 Claims, 9 Drawing Sheets

(56) References Cited

U.S. PATENT DOCUMENTS

| | | | | |
|---|---|---|---|---|
| 2006/0069540 | A1* | 3/2006 | Krutz | G06Q 10/06 703/22 |
| 2007/0233600 | A1* | 10/2007 | McMahon | G06Q 10/06 705/51 |
| 2008/0109289 | A1* | 5/2008 | Vivadelli | G06Q 50/163 705/314 |
| 2008/0262886 | A1* | 10/2008 | Veeningen | G06Q 10/063 705/7.11 |
| 2009/0094216 | A1* | 4/2009 | Hou | G06F 16/2452 |
| 2009/0192867 | A1* | 7/2009 | Farooq | G06Q 30/0201 705/7.29 |
| 2009/0265209 | A1* | 10/2009 | Swaminathan | G06Q 10/06311 705/7.26 |
| 2012/0116839 | A1* | 5/2012 | Akkiraju | G06Q 10/0635 705/7.28 |
| 2012/0130768 | A1* | 5/2012 | Rajagopal | G06Q 10/105 705/7.25 |
| 2012/0216260 | A1* | 8/2012 | Crawford | G06F 21/31 726/5 |
| 2012/0330706 | A1* | 12/2012 | Rabeneck | G06Q 10/06 705/7.13 |
| 2013/0132161 | A1* | 5/2013 | Mohanty | G06Q 10/0637 705/7.36 |
| 2013/0166459 | A1* | 6/2013 | Mohanty | G06Q 10/10 705/310 |
| 2013/0173353 | A1* | 7/2013 | Kamath | G06Q 10/04 705/7.39 |
| 2013/0197863 | A1* | 8/2013 | Rayate | G06F 11/3051 702/186 |
| 2013/0254735 | A1* | 9/2013 | Sakhardande | G06F 8/77 717/100 |
| 2014/0188886 | A1* | 7/2014 | Mahaffey | G06F 16/1734 707/740 |
| 2014/0201714 | A1* | 7/2014 | Vaidyan | G06F 11/3668 717/124 |
| 2014/0244362 | A1* | 8/2014 | Chaudhury | G06Q 10/06375 705/7.37 |
| 2016/0048782 | A1* | 2/2016 | Johnson | G06Q 10/0635 705/7.28 |
| 2016/0342922 | A1* | 11/2016 | McCarthy | G05B 13/021 |
| 2019/0066011 | A1* | 2/2019 | Portnoy | G06Q 10/06312 |
| 2019/0122161 | A1* | 4/2019 | Cicio, Jr. | G06Q 10/063112 |
| 2019/0303118 | A1* | 10/2019 | Avinash Dorle | H04L 41/16 |
| 2019/0332978 | A1* | 10/2019 | Farooq | G06Q 10/06 |

FOREIGN PATENT DOCUMENTS

| | | | | |
|---|---|---|---|---|
| EP | 2610789 A1 | * | 7/2013 | G06Q 10/04 |
| WO | WO-2005013089 A2 | * | 2/2005 | G06Q 10/00 |
| WO | WO-2009094290 A2 | * | 7/2009 | G06Q 10/06 |
| WO | WO-2011106552 A1 | * | 9/2011 | G06F 21/577 |
| WO | WO-2011133904 A1 | * | 10/2011 | G05B 13/021 |

OTHER PUBLICATIONS

Capaldo, Amaral Daniel, and Rozenfeld Henrique. "Integrating new product development process references with maturity and change management models." Guidelines for a Decision Support Method Adapted to NPD Processes (2007). (Year: 2007).*

Dębkowska, Katarzyna. "E-logistics as an Element of the Business Model Maturity in Enterprises of the TFL Sector." Procedia Engineering 182 (2017): 143-148. (Year: 2017).*

Maasouman, Mohammad Ali, and Kudret Demirli. "Development of a lean maturity model for operational level planning." The International Journal of Advanced Manufacturing Technology 83.5 (2016): 1171-1188. (Year: 2016).*

Li, Suike, et al. "Application of organizational project management maturity model based on BP neural network." 2010 International Conference on E-Business and E-Government. IEEE, 2010. (Year: 2010).*

Nemeth, Tanja, Fazel Ansari, and Wilfried Sihn. "A maturity assessment procedure model for realizing knowledge-based maintenance strategies in smart manufacturing enterprises." Procedia Manufacturing 39 (2019): 645-654. (Year: 2019).*

Bushuyev, Sergey, et al. "Complementary Neural Networks for Managing Innovation Projects." 2019 IEEE International Conference on Advanced Trends in Information Theory (ATIT). IEEE, 2019. (Year: 2019).*

* cited by examiner

| Function | Metric | Annual Hours | Year 1 Assumptions | Year 2 Assumptions | SUSTAIN Assumptions |
|---|---|---|---|---|---|
| BPM Processes (Sprint activity) | # of High Risk Processes | 250 | 25% High Risk Carry Over | NA | NA |
| | # of Moderate Risk Processes | 250 | 100% Moderate | NA | NA |
| | # of Low Risk Processes | 100 | NA | 100% Low Risk | NA |
| | Complex - High/Critical | 100 | 50% Increase | 50% Increase | Flat to Initial |
| Issue Management | Simple - Moderate/Low | 80 | 50% Increase | 50% Increase | Flat to Initial |
| | Customer remediation | 240 | 50% Increase | 50% Increase | Flat to Initial |
| | Material Active NBIs | 80 | 25% Increase | 25% Increase | Flat to Prior year |
| RBI Risk Assessments / Product | Immaterial Active NBIs | 30 | 25% Increase | 25% Increase | Flat to Prior year |
| | Post Implementation Reviews | 30 | 25% Increase | 25% Increase | Flat to Prior year |
| | Annual Product Portfolio Monitoring | 30 | 25% Increase | 25% Increase | Flat to Prior year |
| Major Requirements | # of Newly Accepted Major Requirements (MRE) | 10 | Flat | Flat | Flat |
| Control Data Quality Effort | # of high moderate inherent risk MREs | 5 | Eliminate | Eliminate | Eliminate |
| Regulatory Changes | # of regulatory changes / impact assessments | 40 | Flat | Flat | Flat |
| | WPAs reviews planned in year | 80 | Flat | Flat | Flat |
| Reviews | IRM Testing and Validation Reviews Planned in Year | 40 | Flat | Flat | Flat |
| | Regulatory Exams | 80 | Flat | Flat | Flat |
| Policies | # of policies assessed in a year applicable to the business | 96 | Flat | Flat | Flat |
| Third Party Management | # of third parties | 10 | Flat | Flat | Flat |
| RCSA / quarterly risk assessment | # risk acceptances, exceptions | 25 | Flat | Flat | Flat |
| RCSA / Process Based Risk Assessment | # of RAUs | 72 | Decrease by 10% | 60% decrease from Initial | Eliminate |
| Compliance Risk Assessments (UDAAP, Fair Lending, Tax, etc) | # of L4 Processes | 180 | High Risk Processes | High/Moderate Processes | 100% of High 50% Moderate 5% of Low |
| Model Risk Integration | # of risk assessments | 20 | Flat | Flat | Flat |
| OR Programs - Payment Systems Risk | models in inventory | 10 | Flat | Flat | Flat |
| | # of payment systems/webstores | 100 | Flat | Flat | Flat |
| OR Programs - BCP | # of ELCTs | 20 | Flat | Flat | Flat |
| OR Programs | # of BCP plans | 20 | Flat | Flat | Flat |
| SAA (non-Sprint activity) | # of L4 Processes | 40 | 20% Exceptions | 20% Exceptions | 20% Exceptions |
| Consultation / Guidance | # of L4 Processes | 180 | Flat | Flat | Flat |
| | Monthly Risk Committee | 100 | Flat | Flat | Flat |
| | Monthly Operating Review | 60 | Flat | Flat | Flat |
| Reporting | Monthly Control Business Review | 120 | Flat | Flat | Flat |
| | Weekly Executive Updates | 260 | Flat | Flat | Flat |
| | Regulatory Updates | 260 | Flat | Flat | Flat |
| Incident management | # production errors, campaign errors, technology errors | 10 | Flat | Flat | Flat |

Figure 3

METHOD, APPARATUS AND COMPUTER PROGRAM PRODUCT FOR MONITORING METRICS OF A MATURING ORGANIZATION AND IDENTIFYING ALERT CONDITIONS

TECHNOLOGICAL FIELD

An example embodiment of the present disclosure relates to modeling expected values of metrics of a maturing organization, monitoring actual values of the metrics, and identifying alert conditions relating to the maturing organization.

BACKGROUND

Many companies and organizations face challenges relating to resource adequacy planning. Some organizations require extensive oversight to access various systems configured to track human resource capacity information, issues management, change control and/or the like, and apply the data to various reporting templates to produce meaningful or concise results. Continual review of certain indicators must be made for an organization to gauge its success or identify problem areas. Change control relating to attrition, resource allocation, budgeting, and/or the like may require manual processes and review. Once changes are implemented, an organization may need to reassess certain indicators such as those mentioned above. Attempts at computer-assisted solutions may not offer capabilities suited for a complex and ever-changing organization to perform resource adequacy planning over the long term.

BRIEF SUMMARY

A method, apparatus, and computer program product are therefore provided for modeling target values of metrics of a maturing organization, monitoring actual values and predicted values of the metrics, and identifying alert conditions relating to the maturing organization.

An apparatus is provided, comprising at least one processor and at least one memory including computer program code, the at least one memory and the computer program code configured to, with the at least one processor, cause the apparatus to at least access assumption data associated with a first organization, wherein the assumption data is configured via at least a user interface and comprises data defining at least an expected maturity of the first organization and respective quantifiable target developments in at least one metric of the first organization. The at least one memory and the computer program code are further configured to process the assumption data associated with the first organization to generate a model of the first organization, wherein the model comprises target values of one or more selected metrics of the at least one metric of the first organization, wherein the target values are variable over a period of time based on the expected maturity of the first organization, and monitor at least one of actual values or predicted values of the one or more selected metrics relative to the model over the period of time. The at least one memory and the computer program code are further configured to perform the monitoring by accessing respective actual values of the one or more selected metrics associated with the first organization, wherein the respective actual values of the one or more selected metrics change over the period of time. The at least one memory and the computer program code are further configured to perform the monitoring by, in an instance the predicted values are monitored, generating the predicted values based on at least the actual values of the one or more selected metrics. The at least one memory and the computer program code are further configured to perform the monitoring by comparing, at least at a plurality of times over the period of time, at least one of the one or more target values of the one or more selected metrics reflected in the model to the respective actual values or the predicted values associated with the first organization. The at least one memory and the computer program code are further configured to perform the monitoring by determining, based on the comparison, that an alert condition of at least one of the one or more selected metrics is satisfied, and in response to determining the alert condition is satisfied, generating an alert to be provided via the user interface or another user interface.

In certain embodiments, the actual values comprise at least human resource capacity information, and the at least one memory and the computer program code are further configured to, with the processor, cause the apparatus to at least facilitate change management procedures to cause the human resource capacity information to change over the period of time.

The at least one memory and the computer program code are further configured to, with the processor, cause the apparatus to at least perform machine learning by utilizing (a) other target values of the one or more selected metrics relating to a different organization, and (b) actual values of respective one or more selected metrics relating to the different organization, to update the model of the first organization, wherein the updated model provides a change in at least one predicted value of the one or more selected metrics of the first organization.

According to certain embodiments, the first organization is associated with a parent organization, and wherein the at least one memory and the computer program code are further configured to, with the processor, cause the apparatus to at least model and monitor the parent organization, and in response to the monitoring, generate an alert caused by a plurality of respective changes in actual values or predicted values relating to the first organization and a plurality of other organizations associated with the parent organization. Each of the respective changes in the actual values may not cause an individual alert to be generated for at least one of the first organization or one of the plurality of other organizations, but the changes in the actual values for the parent organization cause the alert to be generated.

The at least one memory and the computer program code are further configured to, with the processor, cause the apparatus to at least generate a first data structure representative of a first staffing pyramid of the first organization, generate a second data structure representative of a second staffing pyramid of a second organization, and identify differences between the first staffing pyramid and the second staffing pyramid by comparing the first data structure and the second data structure.

The at least one memory and the computer program code are further configured to, with the processor, cause the apparatus to at least analyze at least one model to determine future workforce needs of a parent organization, analyze at least one model to determine location intelligence information of a parent organization, and analyze at least one model to determine future real estate needs of a parent organization.

The at least one memory and the computer program code are further configured to, with the processor, cause the apparatus to receive at least a portion of the actual values of the at least one selected metric from an issues management system.

The at least one memory and the computer program code are further configured to, with the processor, cause the apparatus to receive at least a portion of the actual values of the at least one selected metric from a human resources system.

In certain embodiments, the at least one memory and the computer program code are further configured to, with the processor, cause the apparatus to at least receive at least a portion of the actual values of the at least one selected metric from a technology resources system.

The at least one memory and the computer program code are further configured to, with the processor, cause the apparatus to at least receive at least a portion of the actual values of the at least one selected metric from a real estate management system.

A method is also provided, including accessing assumption data associated with a first organization, wherein the assumption data is configured via at least a user interface and comprises data defining at least an expected maturity of the first organization and respective quantifiable target developments in at least one metric of the first organization. The method may further include processing, with a processor, the assumption data associated with the first organization to generate a model of the first organization, wherein the model comprises target values of one or more selected metrics of the at least one metric of the first organization, wherein the target values are variable over a period of time based on the expected maturity of the first organization, and monitoring at least one of actual values or predicted values of the one or more selected metrics relative to the model over the period of time. The method, including the method for monitoring, may include accessing respective actual values of the one or more selected metrics associated with the first organization, wherein the respective actual values of the one or more selected metrics change over the period of time. In an instance the predicted values are monitored, the method and method for monitoring may include generating the predicted values based on at least the actual values of the one or more selected metrics, comparing, at least at a plurality of times over the period of time, at least one of the one or more target values of the one or more selected metrics reflected in the model to the respective actual values or the predicted values associated with the first organization. The method and method for monitoring may further include determining based on the comparison, that an alert condition of at least one of the one or more selected metrics is satisfied, and in response to determining the alert condition is satisfied, generating an alert to be provided via the user interface or another user interface.

The method may further include performing machine learning by utilizing (a) other target values of the one or more selected metrics relating to a different organization, and (b) actual values of respective one or more selected metrics relating to the different organization, to update the model of the first organization, wherein the updated model provides a change in at least one predicted value of the one or more selected metrics of the first organization.

In certain embodiments, the first organization is associated with a parent organization, and the method further comprises modeling and monitoring the parent organization, and in response to the monitoring, generate an alert caused by a plurality of respective changes in actual values or predicted values relating to the first organization and a plurality of other organizations associated with the parent organization. Each of the respective changes in the actual values do not necessarily cause an individual alert to be generated for at least one of the first organization or one of the plurality of other organizations, but the changes in the actual values for the parent organization cause the alert to be generated.

The method may further include analyzing at least one model to determine future workforce needs of a parent organization and/or analyzing at least one model to determine location intelligence information of a parent organization.

A computer program product is provided, the computer program product comprising at least one non-transitory computer-readable medium having computer-readable program instructions stored therein, the computer-readable program instructions comprising instructions, which when performed by an apparatus, are configured to cause the apparatus to at least access assumption data associated with a first organization, wherein the assumption data is configured via at least a user interface and comprises data defining at least an expected maturity of the first organization and respective quantifiable target developments in at least one metric of the first organization. The computer-readable program instructions may further include instructions, which when performed by an apparatus, are configured to cause the apparatus to process the assumption data associated with the first organization to generate a model of the first organization, wherein the model comprises target values of one or more selected metrics of the at least one metric of the first organization, wherein the target values are variable over a period of time based on the expected maturity of the first organization. The computer-readable program instructions may further include instructions, which when performed by an apparatus, are configured to cause the apparatus to monitor at least one of actual values or predicted values of the one or more selected metrics relative to the model over the period of time. The computer-readable program instructions may further include instructions, which when performed by an apparatus, are configured to cause the apparatus to perform the monitoring by accessing respective actual values of the one or more selected metrics associated with the first organization, wherein the respective actual values of the one or more selected metrics change over the period of time. In an instance the predicted values are monitored, the computer-readable program instructions may further include instructions, which when performed by an apparatus, are configured to cause the apparatus to perform the monitoring by generating the predicted values based on at least the actual values of the one or more selected metrics, and comparing, at least at a plurality of times over the period of time, at least one of the one or more target values of the one or more selected metrics reflected in the model to the respective actual values or the predicted values associated with the first organization. The computer-readable program instructions may further include instructions, which when performed by an apparatus, are configured to perform the monitoring by determining based on the comparison, that an alert condition of at least one of the one or more selected metrics is satisfied, and in response to determining the alert condition is satisfied, generating an alert to be provided via the user interface or another user interface.

An apparatus is also provided, with means for accessing assumption data associated with a first organization, wherein the assumption data is configured via at least a user interface and comprises data defining at least an expected maturity of the first organization and respective quantifiable target developments in at least one metric of the first organization.

The apparatus further includes means for processing, with a processor, the assumption data associated with the first organization to generate a model of the first organization, wherein the model comprises target values of one or more selected metrics of the at least one metric of the first organization, wherein the target values are variable over a period of time based on the expected maturity of the first organization. The apparatus further includes means for monitoring at least one of actual values or predicted values of the one or more selected metrics relative to the model over the period of time. The apparatus further includes means for accessing respective actual values of the one or more selected metrics associated with the first organization, wherein the respective actual values of the one or more selected metrics change over the period of time. In an instance the predicted values are monitored, the apparatus includes means for generating the predicted values based on at least the actual values of the one or more selected metrics, and means for comparing, at least at a plurality of times over the period of time, at least one of the one or more target values of the one or more selected metrics reflected in the model to the respective actual values or the predicted values associated with the first organization. The apparatus may further include means for determining based on the comparison, that an alert condition of at least one of the one or more selected metrics is satisfied, and in response to determining the alert condition is satisfied, means for generating an alert to be provided via the user interface or another user interface.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE DRAWINGS

Figure 1:
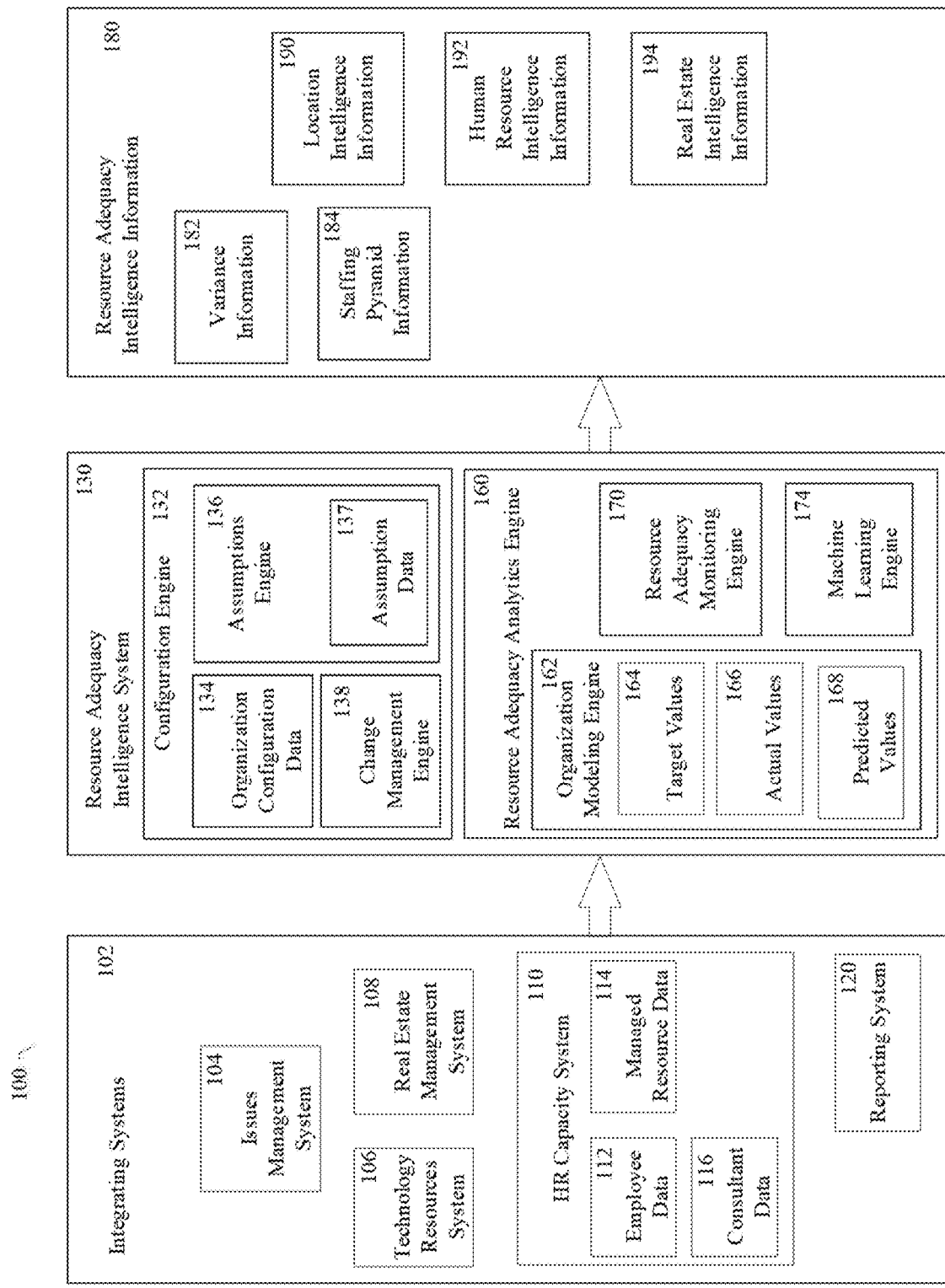
Figure 2:
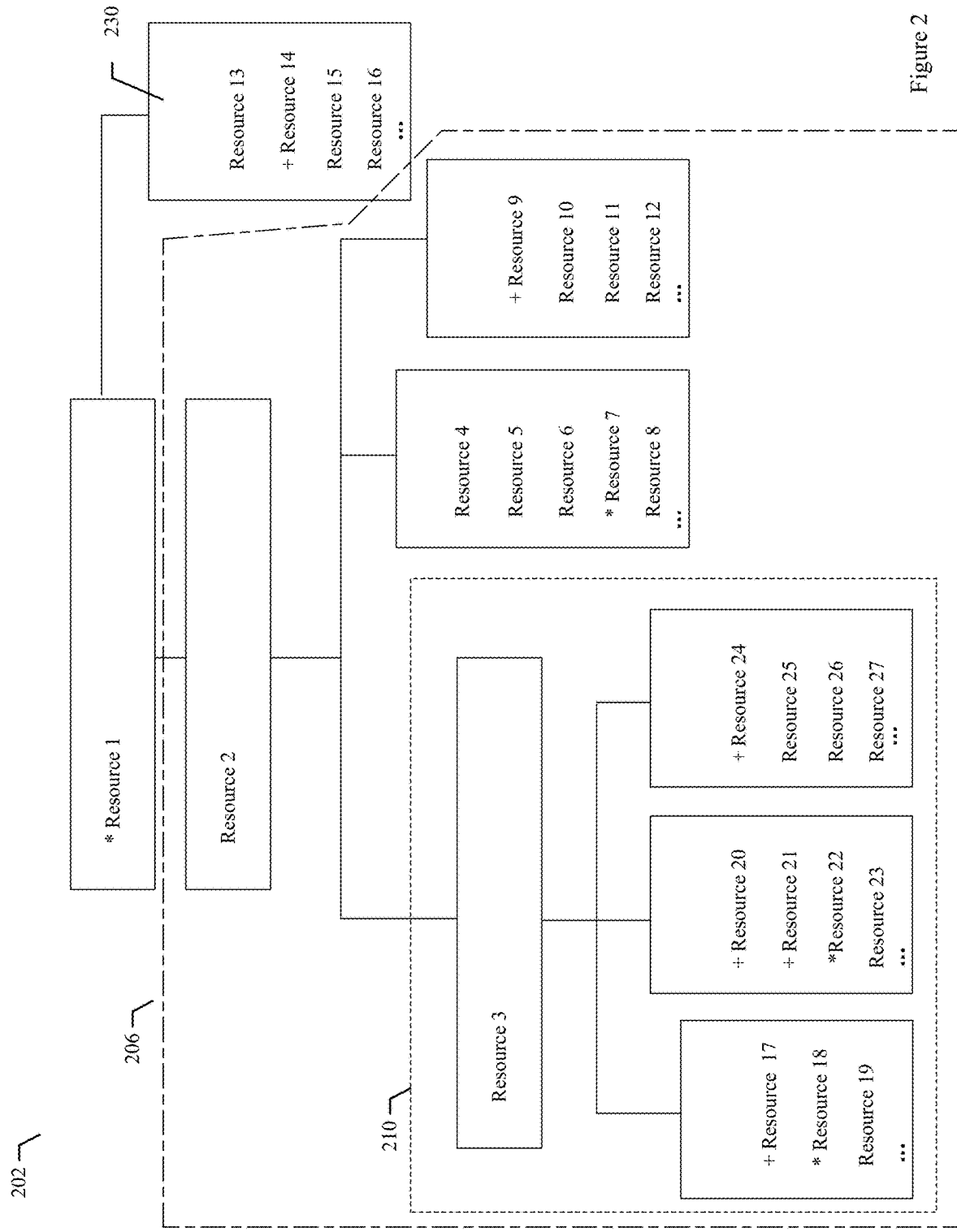
Figure 4:
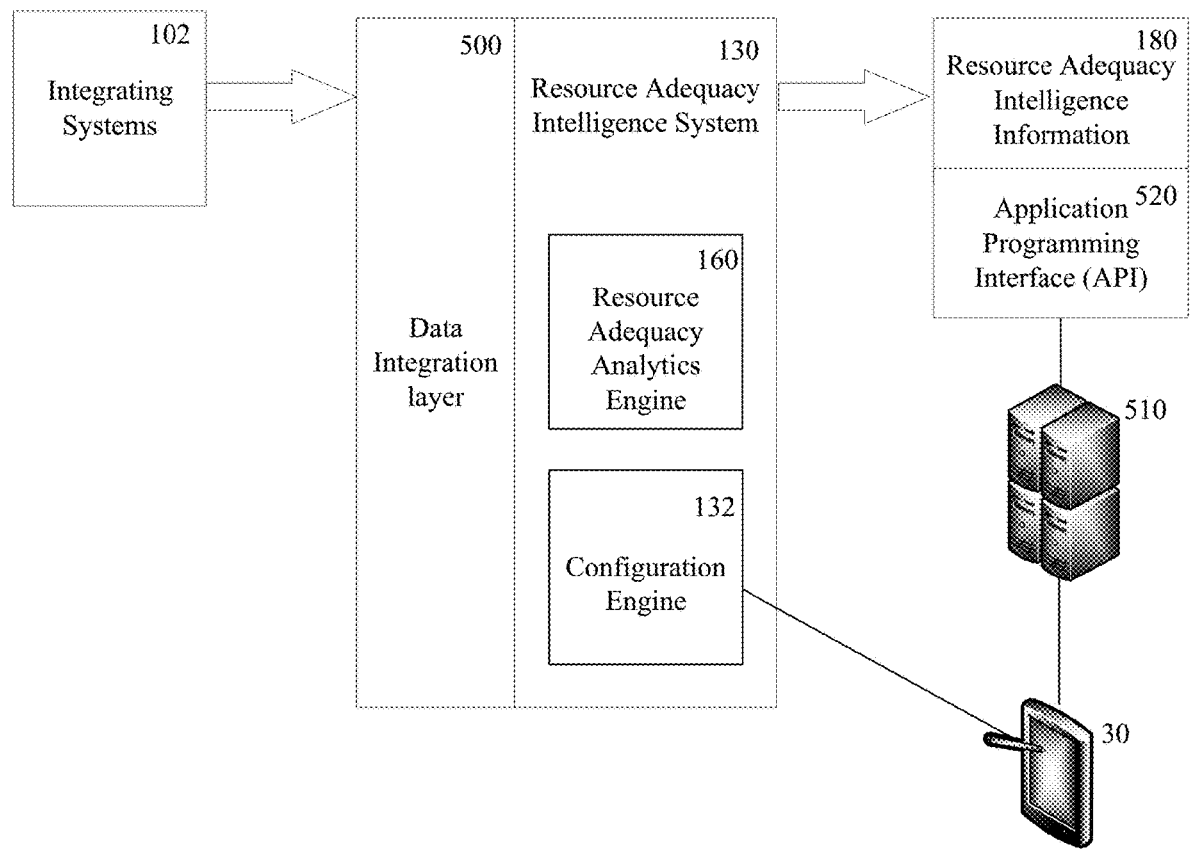
Figure 5:
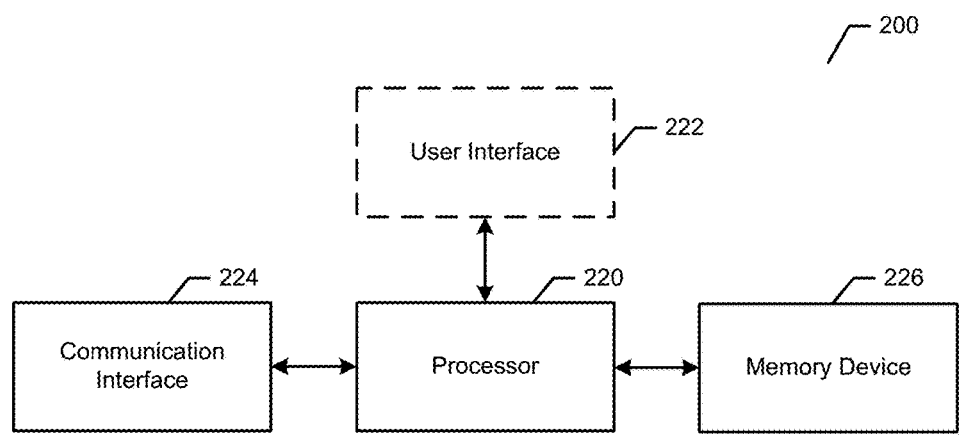
Figure 6:
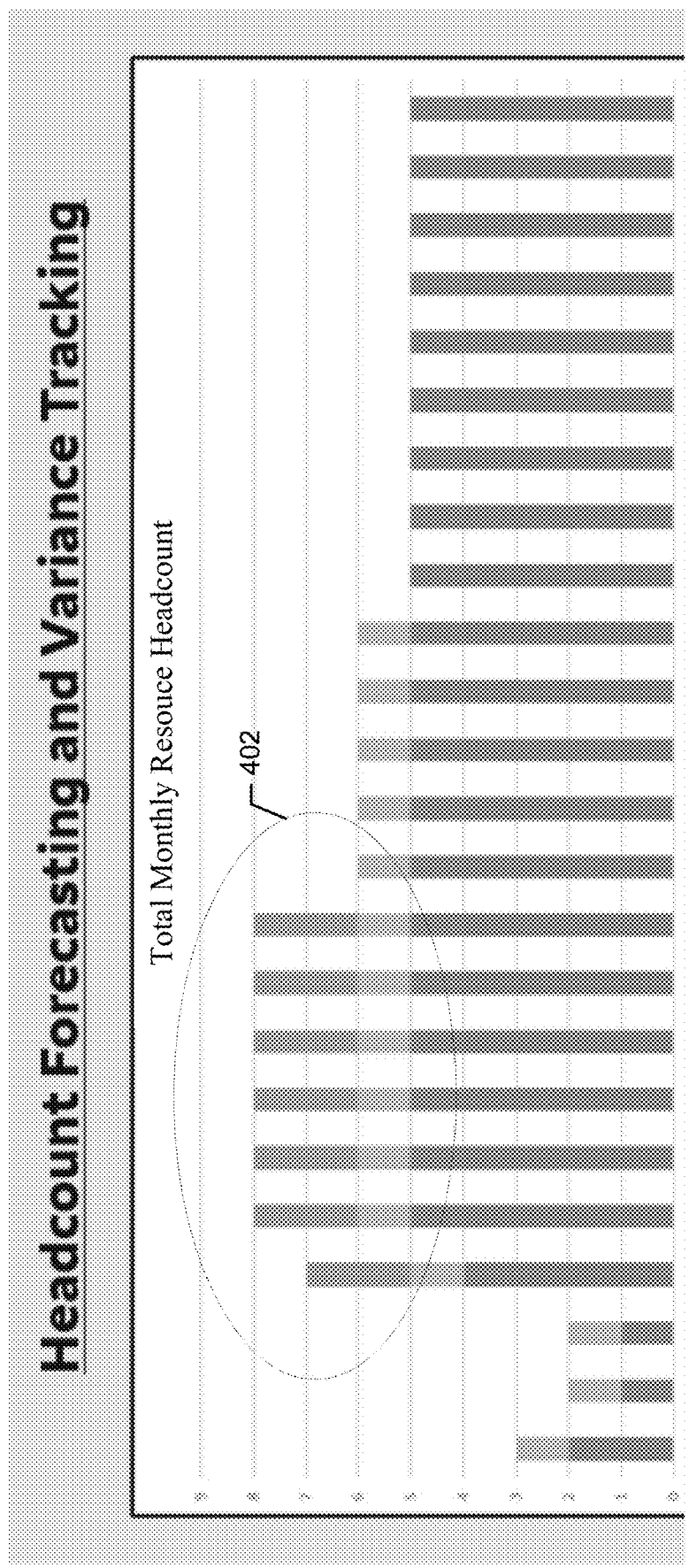
Figure 7:
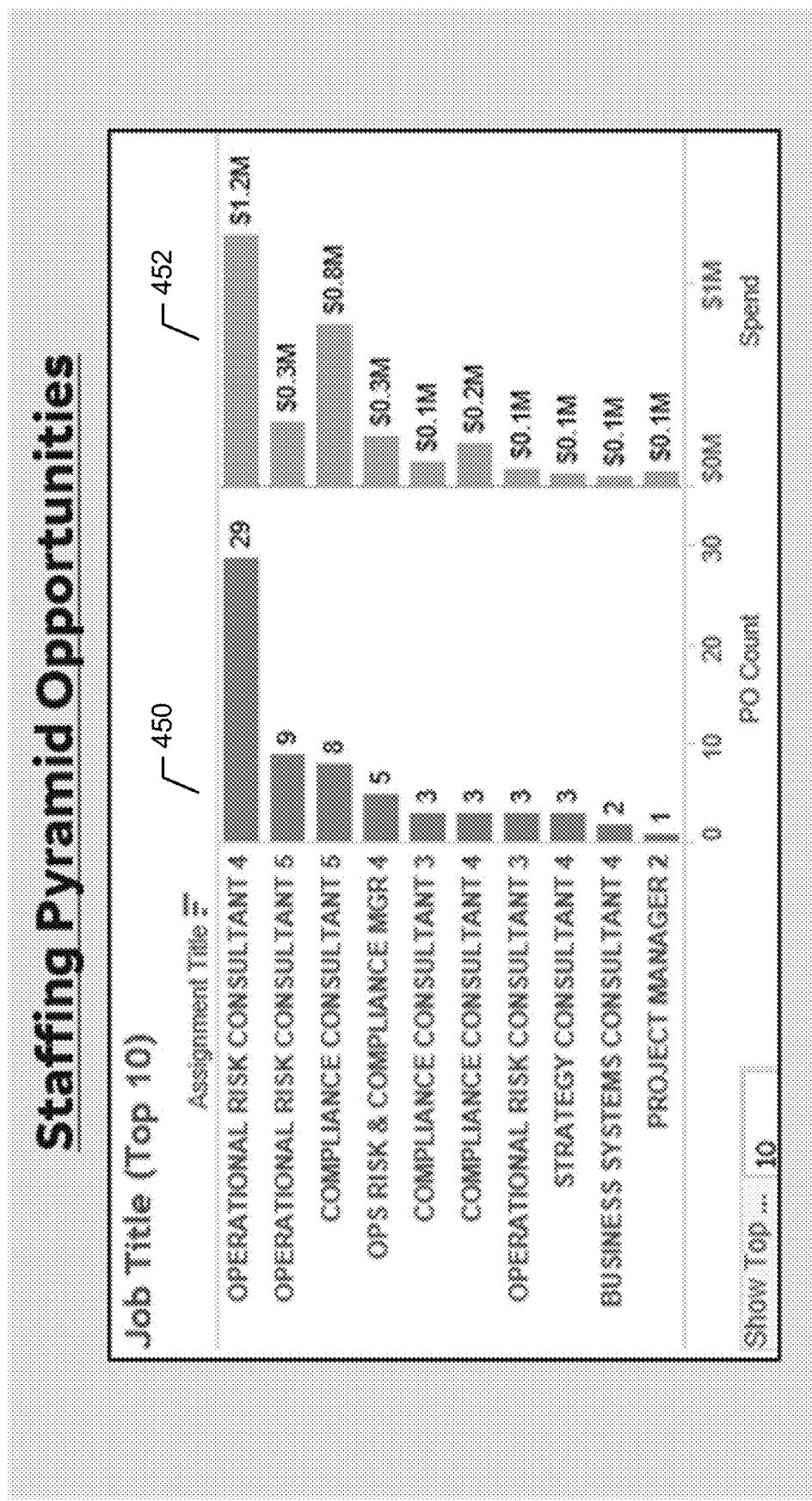
Figure 8:
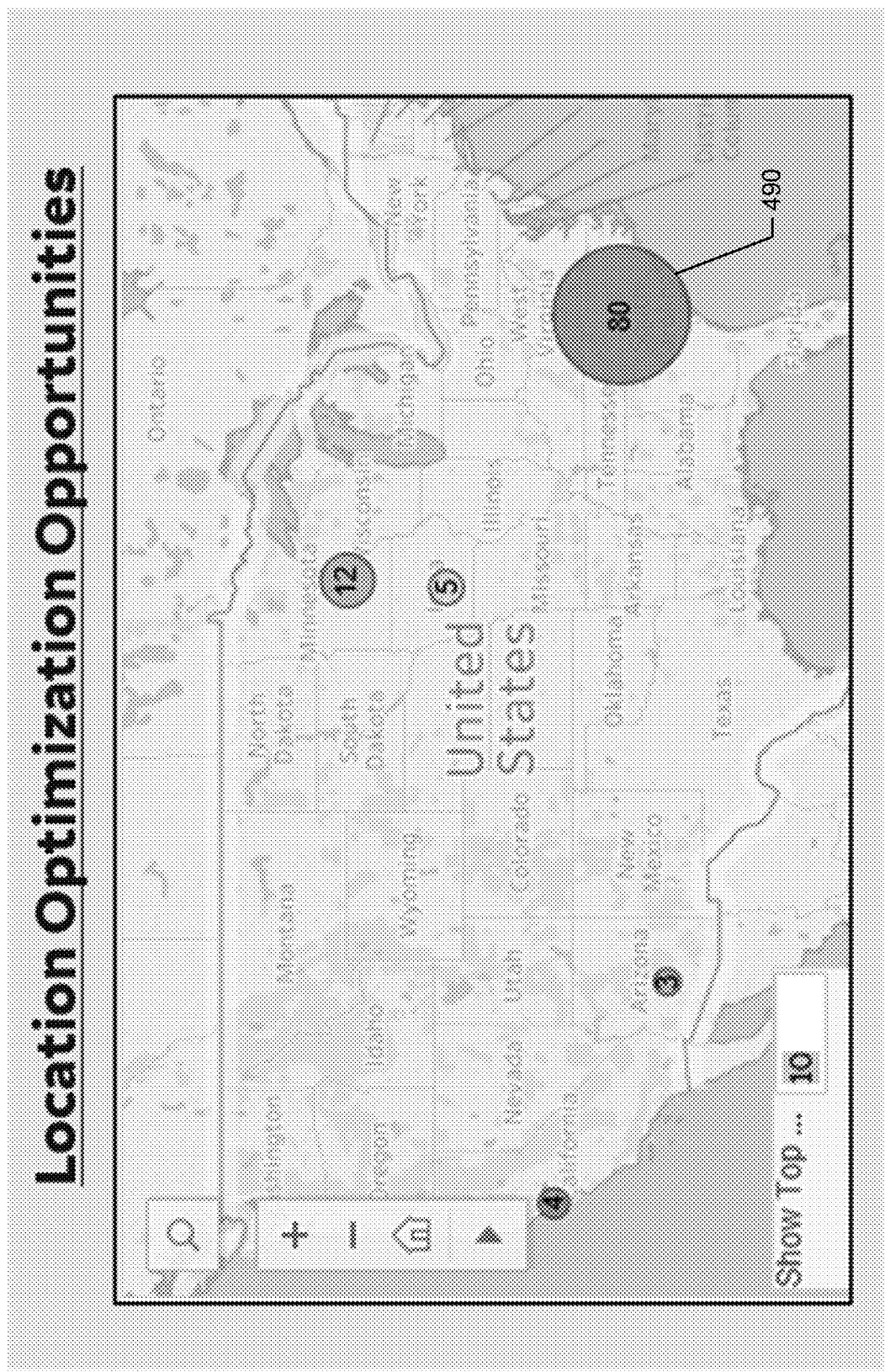
Figure 9:
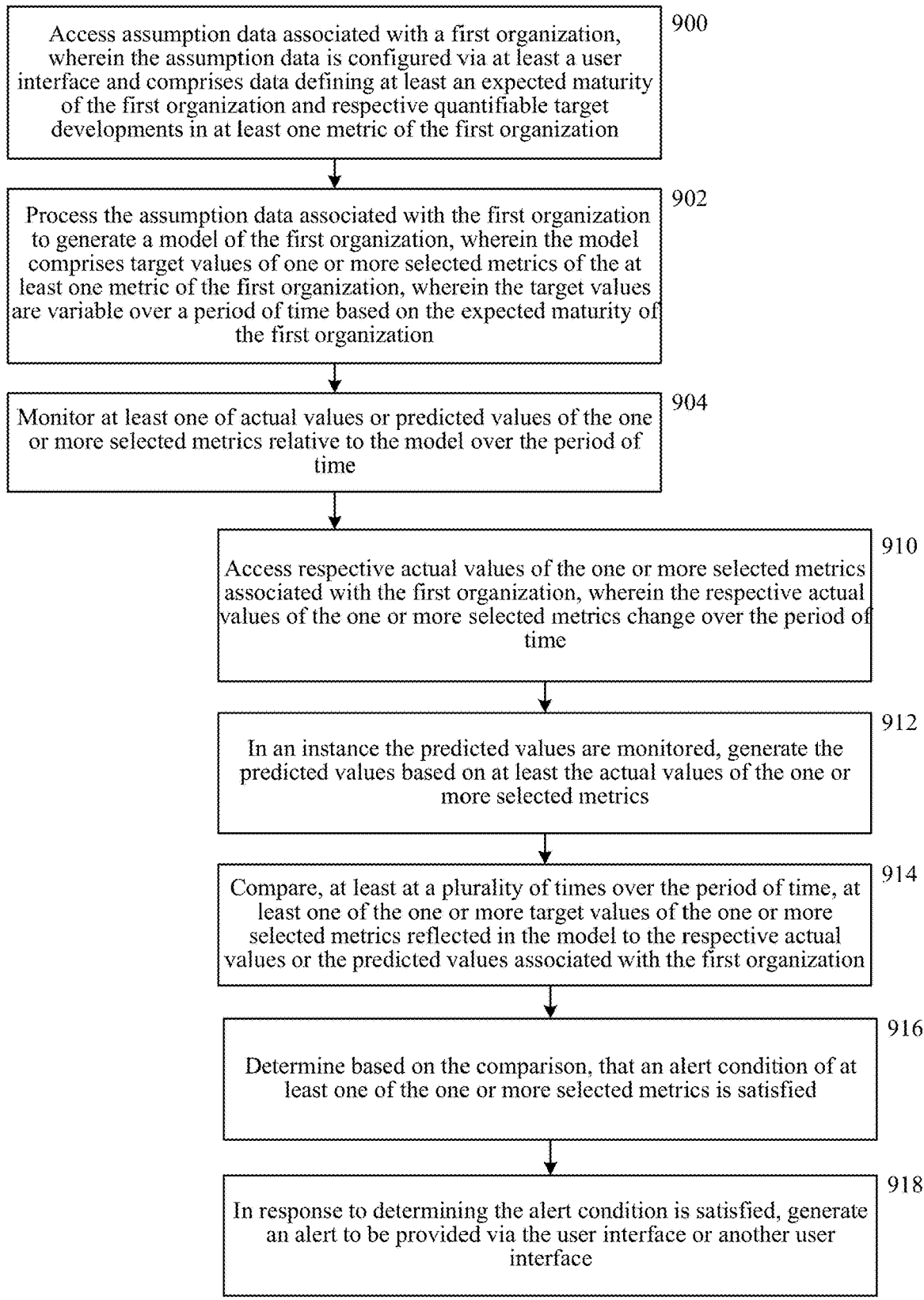
Figure 10:
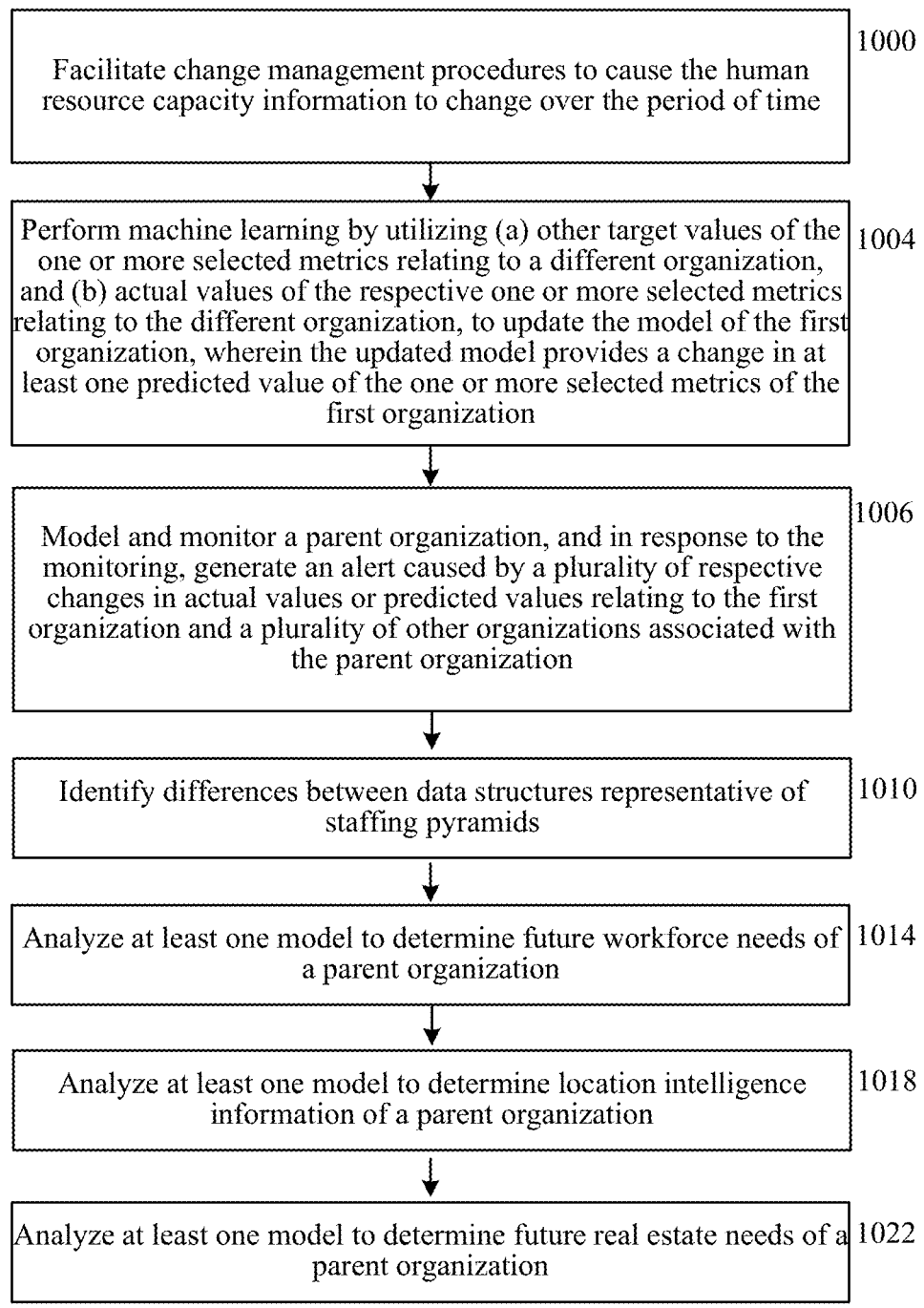

Having thus described certain example embodiments of the present disclosure in general terms, reference will hereinafter be made to the accompanying drawings which are not necessarily drawn to scale, and wherein:

FIG. 1 is an overview of a system that can be used to practice certain example embodiments described herein;

FIG. 2 is a diagram of an organization hierarchy in accordance with some example embodiments;

FIG. 3 is a depiction of data in accordance with some example embodiments;

FIG. 4 is an overview of a system that can be used to practice certain example embodiments described herein;

FIG. 5 is a diagram of an apparatus in accordance with some example embodiments;

FIGS. 6-8 are depictions of data in accordance with some example embodiments; and FIGS. 9-10 are flowcharts of operations that may be performed in accordance with some example embodiments.

DETAILED DESCRIPTION

Some embodiments of the present disclosure will now be described more fully hereinafter with reference to the accompanying drawings, in which some, but not all, embodiments are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with certain embodiments of the present disclosure. Thus, use of any such terms should not be taken to limit the spirit and scope of certain embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

FIG. 1, spanning two pages, is an overview of a system 100 that can be used to practice certain example embodiments described herein, and should not be considered limiting. As illustrated in FIG. 1, certain example embodiments are implemented as or employed in a distributed system. The various depicted components may be configured to communicate over a network, such as the Internet, for example, or any other communication interface as described in further detail hereinafter.

The resource adequacy intelligence system 130 is configured, according to example embodiments, to process information provided by one or more integrating systems 102, and to generate resource adequacy intelligence information 180.

Certain example embodiments may therefore comprise, or may be configured to communicate with any number of integrating systems 102, which may operate independently of other components of the system 100, such that any or all of the integrating systems 102 may function prior to and/or independently of deployment of the resource adequacy intelligence system 130.

The issues management system 104 may include any system and/or computer configured to facilitate the entry, such as via a user interface of issues or problems relating to an organization. The issues management system 104 may be configured to facilitate the resolution of various types of issues within an organization and associated communication to associated parties or individuals. The issues management system 104 may have configurable or pre-configured fields such as target dates for completion, progress notes, risk ratings, associated impacts, and/or the like, and may be configured to track such fields in a database. The issues management system 104 may include additional features to enable generation of reports or summaries relating to issues management. For example, the issues management system 104 may be configured to report summaries including counts of open and resolved issues over a specified period of time, and/or average time until resolution. As another example, issue counts may be grouped or aggregated by suborganizations of larger organizations.

The technology resources system 106 may be configured to track technology resources owned and/or managed by a certain organization For example, the technology resources system 106 may include a tracking system for tracking personal computing devices and/or related accessories distributed to employees, certain equipment operative in offices and/or the field, and/or the like. For example, an information technology division might utilize the technology resources system 106 to track unique identifiers of their technology resources, ages, device models and/or types, dates equipment was distributed to employees, locations of shared equipment, dates expected for equipment return, and/or the like. Details regarding returned and/or repaired equipment, available inventory for loaning and/or extended user may be tracked by the technology resources system 106.

The real estate management system 108 may include any computer and/or system configured to track real estate owned and/or leased by an organization. For example, such a system may track locations of office space and/or other real property, respective square footage, occupancy, vacancy, desk count, office and/or desk space by seniority level (e.g., 10 manager offices, 100 cubicles), meeting space, and/or the like. The real estate management system 108 may associate individual employees to their respective desks, provide a report of available desk space, meeting space availability and/or bookings by date and/or time, lease end dates, and/or any other conceivable information associated with the management of real estate for an organization.

The human resource (HR) capacity system 110 may include any system for managing human resource data such as headcounts, full-time equivalent (FTE) data, and/or the like. In certain embodiments, the data managed by the HR capacity system 110 may include employee data 112, managed resource data 114, and/or consultant data 116. In this regard, an organization may have various methods and/or processes for monetizing and/or otherwise quantifying different types or channels of human resources such that full time employees, managed resources (e.g., contractors) and/or consultants, such as those hired for specific tasks or projects, are separately tracked, but configured to enable normalization or standardization, such as tracking by FTE. The HR capacity system 110 may store a record for each type of human resource, and may have an associated identifier indicating a team or other suborganization within an organization to which the resource is assigned. In certain embodiments, a human resource may be further assigned to multiple teams on a prorated basis.

A reporting system 120 may include any system that provides data to users via a user interface, and may integrate with any of the systems 104, 106, 108, 110, and/or subsystems thereof, and/or other systems implemented within an organization. A reporting system 120 may be configured to retrieve data from any underlying database to provide data that may be utilized by the resource adequacy intelligence system 130. An integrating system 102 and/or reporting system 120 may further include and third-party engagement systems, workflow/ticketing systems, service queues, and/or the like.

The above described systems 104, 106, 108, 110 and 120 are provided merely as examples, and it will be appreciated that a variety of other types of systems may be integrated with the resource adequacy intelligence system 130 according to certain example embodiments. Similarly, the above described functions of the respective systems 104, 106, 108, 110 and 120 are provided merely as examples, and it will be appreciated that numerous other functions relating to the respective systems may be contemplated.

In general, the resource adequacy intelligence system 130 comprises a configuration engine 132 for configuring organizations, and leverages data from the integrating systems 102, to perform resource adequacy analytics with the resource adequacy analytics engine 160. The resource adequacy intelligence system 130 tracks or utilizes a list or table of metrics. The resource adequacy analytics engine 160 determines target values of certain metrics for a particular organization, based on a configuration of the organization according to the configuration engine 132, and/or assumption data 137 configured with the assumptions engine 136. The actual values of the metrics, obtained from integrating systems 102, are analyzed and continually monitored by the resource adequacy analytics engine 160 to generate resource adequacy intelligence information 180. The resource adequacy intelligence system 130 may continually monitor and adjust its processes by which resource adequacy for an organization is gauged. The resource adequacy intelligence system 130 may therefore proactively notify users of potential issues within an organization, in a timely and efficient manner.

The configuration engine 132 of the resource adequacy intelligence system 130 may enable a user, such as via a user interface, to enter information regarding an organization, such as a new organization or team. In certain embodiments, an organization and suborganization thereof may be separately configured such that either may be recognized and/or processed by example embodiments as separate entities. See FIG. 2 for an example of organizations and or suborganizations thereof. Organization 202 may include every resource (e.g., resources 1-27), and every suborganization therein. As another example, organization 210 indicated by a dashed line may be considered as an organization for certain processing and/or monitoring described herein, and/or as a suborganization, and/or child organization of organization 206. In this regard, organization 206 may be a parent organization of organization 210. Various partitions and/or divisions within an organizational hierarchy may be contemplated. This flexibility may enable monitoring at any level or sub-level of an organization as described in further detail below. It will be appreciated that any reference to an organization as used herein may indeed refer to a suborganization or child organization of another organization. The data representing any organization, suborganization, and/or relationships there between, such as data representative of FIG. 2, may be stored as organization configuration data 134. The organization configuration data 134 may include references to data stored by HR capacity system 110, such as human resource identifiers. The organization configuration data 134 may further comprise any categorization or characteristics of resources conceivably relevant to an organization and/or HR capacity system 110, such as but not limited to subject matter expertise, job family, certifications, job level (e.g., Level 1-5), role (e.g., supervisor, manager, director and/or the like), job function, and/or the like. For the purpose of visualization, visual indicators in FIG. 2 that may represent such categorizations or characteristics include symbols '+' and '*'. The visualizations may be provided for explanation of certain functions described in further detail below.

Using a user interface provided via at least configuration engine 132, a user may enter information relating to the organization such as but not limited to an organization name, high-level objectives, a number of initially assigned or current FTEs (and/or breakdowns of full-time, managed resource, consultants, and/or the like). The configuration engine 132 may therefore reference the HR capacity system 110 to indicate human resources assigned to the organization. Any data structure may be used to store organization configuration data 134 such as that described herein and/or depicted in FIG. 2.

The configuration engine 132 may include an assumptions engine 136 for entry or modification of certain assumption data 137, such as the expected time to maturity of the organization (e.g., 3 years). The assumptions engine 136 may enable configuration of initial values or targets for a plurality of metrics, as well as assumed increases and/or decreases in a particular metric over time and/or as an organization matures. It will be appreciated that values of certain metrics, including initial values, target values, predicted values, and/or actual values may be in a variety of formats, such as but not included to counts (e.g., issue counts), annual hours associated with a task, annual costs associated with a task, non-FTE expense, and/or the like. Any quantifiable metric may be used, and some metrics may relate to any period of time (e.g., quarterly, annually, and/or the like.)

For example, FIG. 3, spanning two pages, includes a listing of particular functions 300 of an organization, associated metrics 302, and initial target values 304 of the metrics for an exemplary organization. The functions 300 and metrics 302 may represent standard functions and metrics, which may be reusable, and/or selected, for a particular configuration of an organization. For example the first function 300, "BPM Processes (Sprint activity)", as well as the three corresponding metrics 302 (e.g., High Risk, Moderate Risk and Lower Risk Processes), may apply to an Organizations A and B, but not Organization C, based on how each organization is configured in the configuration engine 132. In any event, for an organization represented in FIG. 3, the initial target values 304 may be entered by a user via the configuration engine 132. For example, respective initial values 304, of 250 annual hours, is allotted for each of the three metrics 302 relating to the "BPM Processes (Sprint activity)" function. According to certain embodiments, the initial values may be the target values for an initial period of time following creation of the organization.

FIG. 3 further illustrates exemplary assumption data 137 that may be configured by the assumptions engine 136. According to the illustrated example, the exemplary organization may be configured with assumption data indicating an assumed time to maturity of 3 years (not illustrated). The year 1 assumption data 312 indicates quantifiable target developments (e.g., rates, or any other measurement of change) in each metric for the first year of the organization, such as in comparison to the initial values or target values 304. The year 2 assumption data 314 indicate quantifiable target developments in each metric for the first year of the organization, such as in comparison to the initial values or target values 304, and/or in comparison to actual values of metrics in year 1 (which may not be necessarily known at a given time). 'Sustain' assumption data 316 may indicate target values of a metric for year 3 and beyond, such as in comparison to initial values or target values, and/or actual values of a metric of prior years. In this regard, quantifiable target developments may be a quantifiable number or calculation, such as a percent change, percent increase, and/or percent decrease in comparison to another value of a metric in any prior time period. As mentioned above, a variety of metrics, any time period for assessment and/or quantifiable target developments, and/or unit of measurement may be contemplated by the configuration engine 132 and/or assumption engine 136 in its configuration of an organization and its corresponding assumption data 137.

As another example, although not illustrated in FIG. 3, certain metrics pertaining to technology needs (e.g., 1 personal computer device per FTE) and/or real estate or office needs (e.g., a number of cubicles and/or offices, and reserved meeting rooms) may be configured with initial target values. Still further, assumption data 137 may include threshold deviations that when reached or exceeded, indicate that an alert condition is satisfied, described in further detail below. For instance, a risk control group may configure certain assumption data 137 regarding acceptable levels of deviation in metrics, or unacceptable deviations that may satisfy or trigger alert conditions.

According to certain embodiments, the assumption data 137 may be manually configured by a user with a user interface. As another example, templates indicating groupings or subsets of metrics to apply to an organization may be provided for selection for a user. Similarly, templates that configure or initially suggest assumption data 137 based on a particular organizational category which may be selected by a user, or entered expected time to maturity, for example, may be stored and applied to an organization configuration. For example, the exemplary assumption data 137 of FIG. 3 may be defaulted or initialized for any organization having an expected time to maturity of 3 years. An organization configured to have an expected time to maturity of 5 years may reflect a more gradual progression in assumption data (e.g., yearly assumption data spanning 5 years), which could reach similar or same sustain assumption data 316 as indicated in FIG. 3.

As another example, the assumption data 137 may be segmented by maturity modes, such as three maturity modes, such as a "build mode," "operational mode," and "sustain mode," for example. Accordingly, the maturity modes may be distributed or aligned over the organization's time to maturity. In this regard, a template of assumption data 137 may be applied to different organizations having different expected times to maturity. It will be appreciated that any variations of configurations, and assumption data for an organization may be contemplated.

Returning to the description of FIG. 1, the change management engine 138 may enable modification or changes to be made to any configuration of an organization and during any business mode, or period of time during a life of an organization. For example, the change management engine 138 may facilitate the change to any aspect of a configuration of an organization, and may further facilitate related subprocesses such as entry of such changes, and approval of the changes by required parties and/or groups. For example, the change management engine 138 may facilitate onboarding and offboarding of human resources, changes to associated roles and/or responsibilities, and/or the like. As such, the change management engine 138 may be integrated with, or at least partially provided by, the HR capacity system 110. In addition to facilitating HR related change management, the change management engine 138 may facilitate the change and approval of changes to configurations and/or assumption data relating to particular organizations. For example, the change management engine may provide for user-modification of one or more assumption data, quantifiable target developments, and/or target values of metrics (e.g., for a particular organization, group thereof, and/or template). The change management engine 138 may further enable modification of, or entry or selection of new metrics, or related functions (e.g., activities of the organization). For example, during the lifecycle of an organization, a user may select an existing function and corresponding set of metrics to monitor in a particular organization. A user may also add and configure new functions and/or associated metrics, and/or the like.

The resource adequacy analytics engine 160 may analyze resource adequacy of an organization configured by the configuration engine 132, according to example embodiments. The organization modeling engine 162 may model certain metrics, such as those configured to be monitored for the organization according to the configuration engine 132, to generate target values 164 of certain metrics, such as for a specified period of time, and/or for each maturity mode of an organization. According to certain embodiments, a visualization of the target values 164 may include a line graph charting an expected metric(s) over time, based on for example, initial target values and/or other assumption data 137, such as quantifiable target developments, relating to increases and/or decreases over time. The actual values 166 of certain metrics may include data received directly from any integrating systems 102 and/or calculated or generated based on data from the integrating systems 102. Predicted values 168 of the metrics may include predicted values of the respective metric in the future, given the actual values 166 and an assumption that no changes to the organization configuration are made (or taking into account changes in the organization configuration, if such changes are made). Example embodiments may generate predicted values 168 in numerous ways. For example, actual values 166 may be extrapolated over time to generate predicted values 168 in the future. As another example, certain embodiments may identify trends or trajectories (such as utilizing machine learning engine 174 described in further detail below) in one organization to apply the trends to a different, but similar organization, and their respective actual values 166, to generate and/or adjust the predicted values 168 of the different organization. For example, the machine learning engine 174 may learn to identify certain actual data as better indicators of future values of the same metrics, and/or other related metrics, in comparison to other types of data that are not as strong indicators. Numerous methods for generating predicted values 168 of metrics may be contemplated.

Accordingly, the organization modeling engine 162 may compare target values 164 to actual values 166 and/or predicted values 168 of certain metrics, to identify deviations (or variance), such as actual deviations or variance from target values 164 that have already occurred based on actual values 166, and/or deviations or variance predicted to occur based on predicted values 168. The resource adequacy monitoring engine 170 may therefore monitor the model and/or corresponding target values 164, actual values 166, and/or predicted values 168 on a continual or routine basis to generate or update resource adequacy intelligence information 180, described in further detail below. The machine learning engine 174 may leverage data from one organization, including target and/or actual values of metrics, and apply it to a configuration of another similar organization. The machine learning engine 174 may identify trends and alter predicted values 168 accordingly. As another example, if one or more organizations demonstrate failure to perform according to a particular target values of metrics (particularly if patterns evolve, with many organizations failing to perform), the machine learning engine 174 may direct the configuration engine 132 to adjust certain assumption data 137 and/or target values 164 accordingly. In certain embodiments, the adjustments may be provided as suggestions for user review and approval prior to systematically applying the change. For example, based on information provided by the machine learning engine 174, a user may be alerted that the assumptions and target values 164 for a particular organization, are unrealistic to be met, based on the track record of other similar organizations. This may lead a user to adjust the assumptions and therefore target values 164, or effect change in the organization configuration, such as by increasing headcount or FTE, and/or increasing the overall experience level of associated human resources, for example.

The resource adequacy intelligence information 180 includes data and/or information generated by the resource adequacy intelligence system 130, and/or visualizations thereof, according to example embodiments. Variance information 182 may include any information, such as visualization information, enabling comparison of actual values 166 and/or predicted values 168 with target values 164, and/or alerts pertaining to a detected variance and/or deviation. For example, certain embodiments generate alerts in response to detecting an alert condition is satisfied, such as an actual value 166 and/or predicted value 168 variating from, or deviating from, the corresponding target value 164 by an amount greater than, or greater than or equal to a threshold variance or deviation. Variance alerts, deviations, and/or threshold variance or deviations may be configured based on associated perceived risks that are monitored by a risk control group, and/or the like. For instance, a risk control group may provide guidance on certain metrics, and further advise or configure threshold variance or deviation settings, with the assumptions engine 136, such that they or other uses may be alerted when such levels, indicating risk, are detected.

An alert may include a message regarding the variance and/or deviations, details regarding the potential issue, and may be provided to any number of users via a user interface. As one example, a trend such as an average of one employee resigning a month many not necessarily satisfy, or trigger, an alert condition when analyzing actual values 166, but paired with a plan for hiring only 1 employee per year may satisfy, or trigger, an alert condition based on predicted values 168, as the predicted value 168 for the headcount in future months, such as 8 months away, falls below the target value 164 to an extent warranting the alert condition. As another example, a sudden resignation of 15 employees on the same day may satisfy, or trigger, an alert condition based on actual values 166 that was not predicted according to the predicted values 168. Accordingly, in certain embodiments, monitoring of both the actual values 166 and/or predicted values 168 with the resource adequacy monitoring engine 170 may be useful.

While an alert may be generated in response to automatic and/or routine monitoring by the resource adequacy intelligence system 130, variance information 182 may further provide relevant data and/or visualizations of comparisons between actual and target values of metrics, even when an alert condition is not necessarily satisfied. For example, see variance information 182 of FIG. 6, which provides an exemplary visual representation of predicted values 168

(and optionally actual values 166), and target values 164 for a headcount or FTE metric. The bar graph represents headcounts for an organization tracked on a monthly basis, where each column represents a month. The representation of actual values 166 is noted as optional, as the entire bar graph may represent future months of predicted values 168. In certain embodiments, a first time period (e.g., month) or several time periods may represent actual values 168 for prior or current time periods. Various categories, such as may be indicated by distinct colors and/or patterns within an individual bar, represent different types of FTEs assigned to the organization. According to the example, the topmost category of the bars indicated at 402 represent FTE variance, or headcount shortage (e.g., difference between target values 164 and one of actual values 168 or predicted values 168). Accordingly, 402 indicates predicted values 168 that reflect 7 months of FTE variance or shortage if a change or correction is not made. The absence of this topmost category in other months indicates no variance or deviation is predicted or detected.

Continuing with the description of FIG. 1 and resource adequacy intelligence information 180, staffing pyramid information 184 may include any details, such as headcounts, dollar cost associated therewith (e.g., salary and compensation), and/or the like, grouped by certain job types or roles currently implemented within an organization and/or in comparison to similar organizations. FIG. 7 provides an exemplary visualization of staffing pyramid information 184, according to certain example embodiments, and for an exemplary organization. The staffing pyramid information 184 may include headcount 450 or FTEs by role (e.g., operation risk consultant) and/or level (e.g., "4" or "5"), and may optionally include a bar chart. The staffing pyramid information 184 may further include staffing cost information 452 for the respective roles and/or levels, or as illustrated in FIG. 7, the respective role-level dyads (e.g., groupings of human resources having a particular role and job level). In this regard, a user may easily discern expenditures for certain roles, levels and/or role-level dyads. Inefficiencies within the staffing pyramid, such as inefficiencies relating to the distribution of staffing cost information 452 amongst the roles, levels and/or role-level dyads may be easily identified.

While FIG. 7 provides a visualization of staffing pyramid information 184, certain embodiments, such as with the resource adequacy analytics engine 160, may monitor certain metrics relating to headcounts and/or FTEs, and/or related expenditures, and generate staffing pyramid information 184 and/or variance information 182 relating thereto. For example, when a predicted and/or actual headcount and/or related expenditure varies by more than a threshold deviation from the associated target value (calculated based on assumption data 137), example embodiments may generate a variance alert. For example, the resource adequacy analytics engine 160 may monitor metrics on an ongoing basis, and may detect that the target values, actual values and/or predicted values reflect a top-heavy organization, such that reorganization may be made to reflect a more evenly distributed staffing pyramid, or one with increased expenditure on lower-level staff and decreased expenditure on higher-level staff. In this regard, the variance information 182 and/or staffing pyramid information 184 may include an alert indicating to the user they should consider redistributing certain expenditures amongst headcounts for particular roles, levels, role-level dyads, and/or the like. In certain embodiments, the staffing pyramid information 184 may include a generated job posting.

In certain embodiments, the machine learning engine 174 may analyze staffing pyramid information 184 relating to other organizations, such as organization similar to a subject organization, and change or recommend changes to the associated metrics for the subject organization accordingly. For example, the machine learning engine 174 may detect that other similar organizations reflect a trend of having different distributions within their staffing pyramid, and change assumption data 137 and/or associated target values of metrics for the subject organization, or recommend such changes accordingly. Many variations and/or usage of the staffing pyramid information 184 may be contemplated.

Returning to FIG. 1, the resource adequacy intelligence information 180 generated by the resource adequacy intelligence system 130 may further include location intelligence information 190, human resource intelligence information 192, and/or real estate intelligence information 194. The resource adequacy monitoring engine 170 may monitor an organization and/or suborganizations to identify opportunities for location optimization, opportunities relating to human resources and/or workforce populate, opportunities relating to real estate, and/or the like. Location intelligence information 190 may include recommendations to establish offices and/or to hire or recruit workforce in particular locations, and/or to utilize human resources or real estate in particular locations. In certain embodiments, location intelligence information 190 may include data relating to actual or current data and/or projections (e.g. one-year, three-year, five-year projections) relating to talent availability, costs, seat availability, and/or the like, for a particular location or market. Location intelligence information 190 may be further generated based on human resource intelligence information 192.

The resource adequacy monitoring engine 170 may monitor an organization and/or suborganizations to identify opportunities, such as within staffing pyramid information 184, alongside target values 164 for various suborganizations within an organization. The monitoring of such organizations along with their target values 164 may be performed by comparing certain data to HR capacity information from the HR capacity system 110. Accordingly, the resource adequacy monitoring engine 170 may generate human resource intelligence information 192 in the form of future demand, for certain suborganizations, or a parent organization as a whole, for FTEs associated with particular roles, levels, role-level dyads, other categorizations or characteristics, and/or the like. Demands relating to particular roles may be generalized accordingly to example embodiments to identify desired skillsets, or degree types of job candidates.

Using demand information, such as workforce demand, determined by the resource adequacy analytics engine 160 and/or resource adequacy monitoring engine 170, the resource adequacy analytics engine 160 may further identify locations identified as potentially satisfying HR demand, and provide related location intelligence information 190 and/or real estate intelligence information 194. For example, the location intelligence information 190 may identify certain geographic areas known to have universities that specialize in certain skills or degrees, or that otherwise demonstrate support for producing the type of workforce predicted to be in demand by an organization. Similarly, the resource adequacy analytics engine 160 may identify real estate intelligence information 194 indicating to purchase or acquire real estate in those areas such that the organization may establish itself in those areas that can meet future workforce demands.

FIG. 8 includes a visualization of location intelligence information 190 according to example embodiments. According to the example of FIG. 8, indicator 490 indicates a demand of 80 FTEs in one geographic region. According to certain embodiments, a user may select the indicator to obtain additional information regarding the associated intelligence information and example embodiments may display additional information regarding the desired resources.

Having now described the integrating system 102, resource adequacy intelligence system 130, and resource adequacy intelligence information 180 of FIG. 1, FIG. 4 is an overview of a system that can be used to practice certain example embodiments described herein. As introduced above, various integrating systems 102 may integrate with the resource adequacy intelligence system 130. Example embodiments may provide a data integration layer 500, such that numerous different systems and applications can be integrated accordingly. For example, various packages may be offered, that are configured to transform data generated by respective types of integrating systems 102, such that the transformed data is ingested by the resource adequacy intelligence system 130. Integrating the data into a standard format for ingestion by the resource adequacy intelligence system 130 may promote re-use and portability to deploy the system at various organizations, and to integrate the system with an organization's existing systems. The resource adequacy analytics engine 160, together with the other components of the resource adequacy intelligence system 130 (not all shown in FIG. 4), generate the resource adequacy intelligence information 180.

A user device 30 may be utilized by a user to configure, with the configuration engine 132, organizations and/or suborganizations thereof, as described in further detail herein. User device 30 may include a wide variety of devices including personal computers, work stations, or mobile terminals, such as laptop computers, tablet computers, smartphones, wearable devices, or any combination of the aforementioned, and other types of voice and text communications systems.

A user device 30 may be further utilized to access applications hosted by the organization's application server(s) 510. Example embodiments may provide an application programming interface (API) 520 to enable applications of the organization to access resource adequacy intelligence information 180. Accordingly, any of the resource adequacy intelligence information 180 generated according to example embodiments may be utilized by applications of the organization. For example, any visualizations, alerts and/or other information provided may be embedded into applications and/or webpages provided by the organization.

The respective systems described above with respect to FIGS. 1 and 4 are provided merely as example implementations and it will be appreciated that certain example embodiments provided herein may be implemented as or employed by any number of different system architectures.

Referring now to FIG. 5, apparatus 200 is a computing device(s) configured for performing certain operations described herein according to certain example embodiments. Apparatus 200 may at least partially or wholly embody any of the components of the systems depicted in FIGS. 1 and 4 described above.

Apparatus 200 may include or otherwise be in communication with processor 220, user interface 222, communication interface 224, and memory device 226. The user interface 222 may be considered optional in certain instances of apparatus 200, as indicated by the dashed line. For example, when apparatus 200 is embodied as the resource adequacy analytics engine 160, user interface 222 may not be present.

In some examples, such as user device 30, apparatus 200 may include a wide variety of devices including personal computers, work stations, or mobile terminals, such as laptop computers, tablet computers, smartphones, wearable devices, or any combination of the aforementioned, and other types of voice and text communications systems. Additionally or alternatively, apparatus 200 may be embodied by a server, such as application server 510. As an additional example, apparatus 200 may be implemented as a distributed system, such as system 100 of FIG. 1.

In some embodiments, the processor 220 (and/or co-processors or any other processing circuitry assisting or otherwise associated with the processor 220) may be in communication with the memory device 226 via a bus for passing information among components of the apparatus 200. The memory device 226 may include, for example, one or more volatile and/or non-volatile memories. In other words, for example, the memory device 226 may be an electronic storage device (e.g., a computer readable storage medium) comprising gates configured to store data (e.g., bits) that may be retrievable by a machine (e.g., a computing device like the processor 220). The memory device 226 may be configured to store information, data, content, applications, instructions, or the like for enabling the apparatus to carry out various functions in accordance with certain example embodiments. For example, the memory device 26 may store computer program code configure to perform functions of the configuration engine 132, resource adequacy analytics engine 160, and/or other components described herein such as those depicted in FIGS. 1 and/or 4. The memory device 26 may further store target values 164, actual values 166, predicted values 168, and/or resource adequacy intelligence information 180. As another example, the memory device 226 could be configured to buffer input data for processing by the processor 220. Additionally or alternatively, the memory device 226 could be configured to store instructions for execution by the processor 220.

In some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 may therefore, in some cases, be configured to implement an embodiment of the present disclosure on a single chip or as a single "system on a chip." As such, in some cases, a chip or chipset may constitute means for performing one or more operations for providing the functionalities described herein.

The processor 220 may be embodied in a number of different ways. For example, the processor 220 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 220 may include one or more processing cores configured to perform independently. A multi-core processor may enable multiprocessing within a single physical package. Additionally or alternatively, the processor 220 may include one or more processors configured in tandem via the bus to enable independent execution of instructions, pipelining and/or multithreading. Accordingly, the use of the term "processing circuitry" may be understood to include a single core processor, a multi-core processor, multiple processors internal to the apparatus, and/or remote or "cloud" processors.

In certain example embodiments, the processor 220 may be configured to execute instructions stored in the memory device 226 or otherwise accessible to the processor 220, such as to carry out any of the functionality described herein. Alternatively or additionally, the processor 220 may be configured to execute hard coded functionality. As such, whether configured by hardware or software methods, or by a combination thereof, the processor 220 may represent an entity (e.g., physically embodied in circuitry) capable of performing operations according to an embodiment of the present disclosure while configured accordingly. Thus, for example, when the processor 220 is embodied as an ASIC, FPGA or the like, the processor 220 may be specifically configured hardware for conducting the operations described herein. Alternatively, as another example, when the processor 220 is embodied as an executor of software instructions, the instructions may specifically configure the processor 220 to perform the algorithms and/or operations described herein when the instructions are executed. However, in some cases, the processor 220 may be a processor of a specific device (e.g., a mobile terminal or network entity) configured to employ an embodiment of the present disclosure by further configuration of the processor 220 by instructions for performing the algorithms and/or operations described herein. The processor 220 may include, among other things, a clock, an arithmetic logic unit (ALU) and logic gates configured to support operation of the processor 220.

Meanwhile, the communication interface 224 may be any means such as a device or circuitry embodied in either hardware or a combination of hardware and software that is configured to receive and/or transmit data from/to a network and/or any other device or module in communication with the apparatus 200. In this regard, the communication interface 224 may include, for example, an antenna (or multiple antennas) and supporting hardware and/or software for enabling communications with a wireless communication network. Additionally or alternatively, the communication interface 224 may include the circuitry for interacting with the antenna(s) to cause transmission of signals via the antenna(s) or to handle receipt of signals received via the antenna(s). In some environments, the communication interface 224 may alternatively or also support wired communication. As such, for example, the communication interface 224 may include a communication modem and/or other hardware/software for supporting communication via cable, digital subscriber line (DSL), universal serial bus (USB) or other mechanisms. Communication interface 224 may include a network (e.g., network 10), such as any wired or wireless communication network including a local area network (LAN), personal area network (PAN), wide area network (WAN), the Internet, an intranet, or the like, as well as any attendant hardware, software and/or firmware required to implement said networks (e.g. network routers and network switches). The communication interface 224 may be configured to facilitate communication between apparatus 200 and other devices. For example, communication interface 224 may enable communication amongst the various components of the systems of FIG. 1 and/or FIG. 4.

In some embodiments, such as when apparatus 200 is embodied as user device 30, a user interface 222 may be present. The user interface 222 may be configured to cause provision of any audible, visual, mechanical or other output to the user. As such, the user interface 222 may include a display, such as one configured for displaying resource adequacy intelligence information 180. In some examples, user interface 222 may include additional output mechanisms. The user interface 222 may include a means for user input, such as a keyboard, mouse, joystick, touch screen, touch areas, scroller ball, soft keys, a microphone, speaker, or other input mechanisms such as those used to provide organization configuration data 134 and/or corresponding assumptions via the configuration engine 132.

In some examples, the processor 220 may comprise user interface circuitry configured to control at least some functions of one or more of the aforementioned user interface elements. The processor 220 and/or user interface circuitry comprising the processor 220 may be configured to control one or more functions of one or more user interface elements through computer program instructions (e.g., software and/or firmware) stored on a memory accessible to the processor 220 (e.g., memory device 226, and/or the like). In some examples, user interface 222 may be embodied by a user device that is remote from or external to apparatus 200.

Having now described example embodiments of apparatus 200, FIG. 9 is a flowchart of operations performed by apparatus 200 according to certain example embodiments. As shown by operation 900, apparatus 200 may include means, such as the processor 220, communication interface 224, memory device 226, or the like, for accessing assumption data 137 associated with a first organization, wherein the assumption data 137 is configured via at least a user interface and comprises data defining at least an expected maturity of the first organization and respective quantifiable target developments in at least one metric of the first organization. For example, as described above, assumption data 137, including quantifiable target developments, and expected time to maturity, may be configured by a user with the use of user interface 222, the configuration engine 132, and/or assumptions engine 136, and may be stored on memory device 226, and subsequently accessed by the processor 220.

As shown by operation 902, apparatus 200 may include means, such as the processor 220, memory device 226, or the like, for processing the assumption data 137 (e.g., expected time to maturity, and quantifiable target developments) associated with the first organization to generate a model of the first organization, wherein the model comprises target values of one or more selected metrics of the at least one metric of the first organization. Processor 220 may calculate target values 164 by applying the quantifiable target developments (such as those indicated by assumption data 137, such as assumption data 312, 314, and/or 316 of FIG. 3) to actual values of the respective metrics, such as may be received from any number of integrating systems, for example, the same or similar to integrating system 102. Accordingly, the target values are variable over a period of time, based on the expected maturity of the first organization. Whereas the quantifiable target developments may represent percent changes over time, the target values calculated and incorporated into the model indicate target values of the metrics, such as a number of issues, hours to spend on particular functions, and/or the like. A model may further include or may be modified to include predicted values of one or more metrics, as described in further detail below with respect to operation 912. In this regard, the model may be referenced herein to refer to any data such as target values 164, actual values 166, and/or predicted values 168 accessed or generated according to example embodiments. The model may be updated as described in further detail below.

Accordingly, in operation 904, apparatus 200 may include means, such as the processor 220, communication interface 224, memory device 226, or the like, for monitoring at least one of actual values or predicted values of the one or more selected metrics relative to the model over the period of time. For example, the resource adequacy monitoring engine 170 may perform the monitoring over an extended period of time, such as the lifespan of an organization. Details regarding the monitoring are provided with respect to operations 910, 912, 914, 916 and 618 described below. The monitoring may be performed on a continual, or repeated basis, such that pertinent information can be generated and disseminated in an efficient manner response to changes in an organization or related metrics. For example, the operations 910, 912, 914, 916 and 918 may be performed on a daily basis, or any other time interval and over a period of time, such as several years or the lifetime of an organization, for example.

As shown by operation 910, apparatus 200 may include means, such as the processor 220, user interface 222, communication interface 224, memory device 226, or the like, for accessing respective actual values of the one or more selected metrics associated with the first organization, wherein the respective actual values of the one or more selected metrics change over the period of time. The actual values may be received and/or accessed from any number of integrating systems 102. For example, an actual value of the number of issues at the given time and associated with the first organization may be provided from issues management system 104. As another example, the technology resources system 106 may provide a number of available personal computers allocated for the first organization, at a given point in time. The HR capacity system 110 may provide actual values of information regarding to human resources, such as FTEs, and/or FTEs assigned to a particular organization. A reporting system 120 may provide actual values, such as hours spent on particular functions, such as any of the functions 300 of FIG. 3. For example, a reporting system 120 may leverage a time entry system in which employees enter time spent on particular projects or functions, to provide the total hours spent by an organization on respective projects or functions. As another example a billing or invoicing system may provide actual values of non-FTE expenses. Various data provided by such integrating systems 102, may be contemplated for ingestion as actual values of the one or more selected metrics. The actual values obtained via any iteration of operation 910 may change over time.

Whereas according to certain embodiments, actual values may be monitored, predicted values may additionally or alternatively be monitored as described below. Accordingly, as shown by operation 912, apparatus 200 may include means, such as the processor 220, memory device 226, or the like, for generating the predicted values based on at least the actual values of the one or more selected metrics, in an instance the predicted values are monitored. In this regard, processor 220 may extrapolate and/or apply determined trends (e.g., determined by machine learning engine 174) to the actual values to make prediction regarding future values of the metrics, therefore enabling example embodiments to detect and/or predict if current changes in an organization and/or other data from an integrating system 102 (reflected by actual values of metrics) may be likely to cause or organization to miss its targets, as described in further detail below.

Regardless of whether the resource adequacy intelligence system 130 monitors actual values, or both actual values and predicted values, the processor compares the actual and/or predicted values to the target values. In particular, in operation 914, apparatus 200 may include means, such as the processor 220, memory device 226, or the like, for comparing, at least at a plurality of times over the period of time, at least one of the one or more target values of the one or more selected metrics reflected in the model to the respective actual values or the predicted values associated with the first organization. As such, example embodiments, such as processor 220 of apparatus 200 may calculate a difference between an actual value and target value of a metric (such as for a recent and/or current time frame), and/or a difference between a predicted value and target value of a metric (such as for a time frame in the future).

In operation 916, apparatus 200 may include means, such as the processor 220, user interface 222, communication interface 224, memory device 226, or the like, for determining based on the comparison, that an alert condition of at least one of the one or more selected metrics is satisfied. In this regard, a threshold deviation for respective metrics may be determined, and/or configured with the configuration engine 132 and/or user interface 222. For example, any value of a metric (e.g., actual value or predicted value) having a deviation or variance of 20% or more from the target value may indicate variance information 182, and may satisfy, or trigger, an alert condition. Various requirements and/or thresholds relating to variance information 182 or detected deviations may be contemplated.

In any event, in response to determining the alert condition is satisfied, in operation 918, apparatus 200 may include means, such as the processor 220, user interface 222, communication interface 224, memory device 226, or the like, for generating the alert to be provided via the user interface (the user interface by which the organization was configured), or another user interface, such as a user interface of user device 30. The alert may be provided via electronic mail, and transmitted to email addresses or human resources configured in the organization configuration data 134 and/or the like. As another example, a short message service (SMS) message may be generated and transmitted. Numerous variations may be contemplated. The message may indicate the particular metric for which the alert was generated, and may further provide details regarding the actual value and/or predicted value relative to the target value. Providing the alert via a user interface enables the user to react to the message and take corrective action.

For example, a user may make changes in the organization configuration and/or assumption data 137 that reflects more realistic expectations of the organization. As another example, such as in response to identifying a satisfied alert conditions relating to a high number of issues, the FTE count could be increased, or the staffing pyramid altered to include more employees experienced with resolving the particular type of issue. In another example, in response to an alert indicating lower hours than desired spent on certain functions, employees may be encouraged to focus their efforts on the certain function, and/or additional FTEs may be brought into an organization to accomplish the functions. Various corrective actions may be considered in response to provision of the alert condition on a user device.

FIG. 10 is a flowchart of operations performed by apparatus 200 according to certain example embodiments. As shown by operation 1000, apparatus 200 may include means, such as the processor 220, user interface 222, communication interface 224, memory device 226, or the like, for facilitating change management procedures to cause the human resource capacity information to change over the period of time. As described above, a user may access a user interface generated by the change management engine 138 to change organization configuration data 134, assumption data 137, and/or the like. For example, a user could re-assign one FTE or individual employee from one organization to another, increase a target value of a metric relating to headcount, and/or the like. The change management engine 138 may further facilitate offboarding, changes to employee categorization and/or characteristics, and/or the like. Accordingly, one skilled in the art can contemplate numerous downstream impacts to the resource adequacy intelligence system 130. For example, as the resource adequacy monitoring engine 170 continues to monitor the organization, such as on a daily basis, certain alert conditions may be detected in response to changes approved and/or entered via the change management engine 138. For example, in response to offboarding of an employee, alert conditions for metrics relating to headcount and/or staffing pyramids may be satisfied, such that alerts are generated. For example, a shift from a majority of full-time employees to a majority of managed resources (temporary staff) may satisfy, or trigger, an alert condition for an organization as the higher proportion of managed resources may present risk for the organization. Other change management procedures may include other event-driven changes such as but not limited to:

- Change in desired human resource channel/type for a project or organization
- Change in job level of a human resource
- Change in job family or job description of a human resource
- Change in start/end dates of FTE, contractor, consultant, etc.
- Adding of new human resource to organization or project
- FTE attrition
- Human resource has change in working relationship with organization (Non-FTE contract to hire "trial run")
- Internal leadership transfers It will therefore be appreciated that numerous other changes, including event-driven changes, may be configured with the change management engine 138.

As shown by operation 1004, apparatus 200 may include means, such as the processor 220, user interface 222, communication interface 224, memory device 226, or the like, for performing machine learning by utilizing (a) other target values of the one or more selected metrics relating to a different organization, and (b) actual values of the respective one or more selected metrics relating to the different organization, to update the model of the first organization, wherein the updated model provides a change in at least one predicted value of the one or more selected metrics of the first organization. In this regard, actual values of the metrics for a different organization can be used to train the resource analytics engine 160 to more accurately predict values of certain metrics. Organizations can be identified based on similarities such as staffing pyramids and/or any other organization configuration data 134. The data identified as strong indicators of certain metrics, as indicated by the performance of the other organizations, can be weighted more heavily than other data, and a model of the first organization can be updated accordingly. In certain embodiments, a neural network may be used and updated to reflect the variable impact of certain metrics over others, in predicting other related metrics. As certain organizations evolve to produce actual values of metrics, the actual values of the metrics can be used as a training set with which to train the neural network and/or organization modeling engine 162. In this regard, the organization modeling engine 162 can evolve to generate more accurate predicted values 168, which in turn, may enable the resource adequacy intelligence system 130 to more efficiently generate alerts, such as in response to a predicted value moving off track from a target value, for example.

In operation 1006, apparatus 200 may include means, such as the processor 220, user interface 222, communication interface 224, memory device 226, or the like, for modelling and monitoring a parent organization, and in response to the monitoring, generate an alert caused by a plurality of respective changes in actual values or predicted values relating to the first organization and a plurality of other organizations associated with the parent organization. As introduced above and described with respect to FIG. 2, organization configuration data 134, and respective monitoring, can be applied at any level of an organization. Certain metrics may be monitored across a larger, parent organization, while the same and/or different metrics may be monitored within smaller, child organizations. In this regard, according to an example embodiment, processor 220 of the resource adequacy analysis engine 160 may apply any of the methods described herein to detect alert conditions being satisfied at any level of an organization hierarchy. For example, the following scenario is presented with reference to FIG. 2. Resources 17, 20, 24, 9 and 14 all have a common indicator '+' indicating, for example, a common job function of auditor. If Resource 17 departs from the organization and/or associated company, an alert (e.g., individual alert) relating to organization 210 may not necessarily be generated. Similarly, if Resource 9 departs, an alert (e.g., individual alert) relating to organization 206 may not necessarily be generated. And, if Resource 14 departs an alert (e.g., individual alert) relating to organization 230 may not necessarily be generated. However, departure of Resources 17, 9 and 14 may be collectively detrimental to the larger, parent organization 202, such that an alert condition is satisfied relating to metrics of the organization 202, such that an alert relating to the parent organization 202 may be generated. Such example embodiments may be particularly useful when individual human resources, such as managers, are focused on their smaller child organizations and may not collaborate, or may not collaborate frequently enough, to timely identify potential issues with a changing workforce at a broader or higher level of an organizational hierarchy. Similarly, example embodiments may expose issues across broader or higher levels of an organizational hierarchy relating to other resources (e.g., technology resource, real estate and/or other space, expenses, and/or the like), and may particularly do so more quickly, more accurately, and/or more efficiently than what would be performed in an alternative manual review.

One skilled in the art can readily appreciate the complexity of a larger organization than that depicted in FIG. 2, and the associated multitude of levels and hierarchies throughout, and therefore the associated value in certain monitoring features as described herein. Particularly with the increase of complexity of an organization, there may be increased opportunities for alerts to be generated at various levels within a hierarchy and for different parent organizations, even in scenarios where individual alerts are not generated at lower levels or for child organizations or suborganizations. Similarly, the multitude of various categorizations and/or characteristics of employees introduces complexities and increases the value of such example embodiments. For instance, significant attrition across an organization (e.g., a parent organization) or company, having a certain experience level(s) such as levels 3 and 4, which may be considered mid-level, may expose potential problems or risks with a shortage of employees prepared to move into management or other jobs associated with level 5 experience ratings. Such attrition may not be otherwise apparent when only single or small numbers of those employees are leaving each child organization and/or suborganization, because some companies are so focused on managers managing their individual teams. As another example, certain embodiments may identify significant departure of, or shortages of, employees in certain cross-functional roles, such as risk officers specializing in their respective organizations. In this regard, various organization configuration data 134 may be advantageously configured at various levels or hierarchies of an organization, and various corresponding assumption data 137 may be configured to account for target developments at any level of an organization hierarchy.

Continuing with the flowchart of FIG. 10, as shown by operation 1010, apparatus 200 may include means, such as the processor 220, communication interface 224, memory device 226, or the like, for identifying differences between data structures representative of staffing pyramids. In this regard, the configuration engine 132 may store organization configuration data 134 in a data structure or object that represents the hierarchical organization. The data structure may capture hierarchies within an organization and/or how the organization relates to a larger organization. For example, the organization configuration data 134 of FIG. 2 may be stored in a data structure on memory 226. In this regard, processor 220, of the resource adequacy analytics engine 160 may compare various data structures and/or objects representing staffing pyramids and determine differences therebetween. In this regard, the resource adequacy intelligence system 130 can generate the staffing pyramid information 184, such as the exemplary staffing pyramid opportunities of FIG. 7. According to certain embodiments, the resource adequacy analytics engine 160 may compare data structures of organizations having similarities, such as progression toward maturity (e.g., organizations in the same maturity mode or year of development) and identify differences. For example, an organization may be identified as too top-heavy (e.g., including many employees in Level 5, or highly experienced positions) in its 'sustain' mode, whereas other organizations in their 'sustain' mode can rely more heavily on lower level, or entry level employees (e.g., Levels 1-3). Using the data structures to represent staffing pyramids, along with the other automated features of the resource adequacy intelligence system 130, provides an efficient and effective solution to identify such inefficiencies, and may generate alerts accordingly. Still further, by utilizing the machine learning engine 174, the resource adequacy analytics engine 160 can adjust ideal, or target staffing pyramids that an organization should aim to achieve, to have an increased chance of success at meeting its goals.

As shown by operation 1014, apparatus 200 may include means, such as the processor 220, user interface 222, communication interface 224, memory device 226, or the like, for analyzing at least one model to determine future workforce needs of a parent organization. In this regard, the resource adequacy intelligence system 130 may leverage the modeling and monitoring functions described herein to glean information regarding future workforce needs. In this regard, an organization or company may be modelled at a high level, such as company-wide, or example embodiments may leverage respective models of several suborganization. In certain examples, the machine learning engine 174 applies trends in certain metrics of some organizations or suborganizations, to better predict values of those metrics in other organizations. Collectively, the predictions can provide human resource intelligence information 192 for a parent organization, such as a company. The company may therefore be informed and guided to recruit certain skillsets, job functions, job levels, and/or the like, and drive talent acquisition accordingly. Accordingly, the resource adequacy intelligence system 130 may be configured to drive at least some aspects of a master plan for a company or other large organization.

Similarly, in operation 1018, apparatus 200 may include means, such as the processor 220, user interface 222, communication interface 224, memory device 226, or the like, for analyzing at least one model to determine location intelligence information of a parent organization. As described above with reference to FIG. 8, resource adequacy intelligence system 130 may alert users of location optimization opportunities. The information may be collectively analyzed to determine certain areas of future demand for an organization or company. As such, in operation 1022, apparatus 200 may include means, such as the processor 220, user interface 222, communication interface 224, memory device 226, or the like, for analyzing at least one model to determine future real estate needs of a parent organization. In this regard, a company or organization may be alerted to an increase need for space in an existing office location, and/or may be alerted with a recommendation to establish a new office in a new location, and therefore to acquire real estate in the new location. The real estate intelligence information 194 may further assist an organization in developing a corporate real estate strategy. Certain combinations of resource adequacy intelligence information 180, such as location intelligence information 190, human resource intelligence information 192, and/or real estate intelligence information 194 may be combined in various ways to predict the future needs of a company or organization.

As mentioned throughout with reference to several example embodiments and scenarios, deploying the resource adequacy intelligence system 130 in a large organization or company may exacerbate certain benefits described herein, providing a practical application of certain concepts provided herein, such as but not limited to those relating to data modeling, predictions, comparisons of data to generate alerts, machine learning, and/or the like. For instance, integration of the resource adequacy intelligence system 130 with integrating systems 102 provides the practical application of leveraging existing systems and data to monitor the actual values of related metrics and at various levels of an organization hierarchy, to generate resource adequacy intelligence information 180. The generated intelligence information may relate to a broad spectrum of metrics assessed on a continual basis, that would otherwise be nearly impossible or so burdensome for a data analyst to practically calculate in the mind and/or with conventional tools, that the data analyst would likely be unable to keep up with the routine monitoring at a frequency needed to timely alert stakeholders within the organization.

Moreover, the example embodiments presented herein provide a non-routine and unconventional utilization of certain data, such as data from the integrating systems 102. For instance, using data from an issues management system 104 to track certain metrics relating to issues, which may ultimately lead to the generation of resource adequacy intelligence information 180 (e.g., location intelligence information 190, real estate intelligence information 194, and/or the like), provides a non-routine and unconventional solution.

As described above, FIGS. 9 and 10 illustrate flowcharts of an apparatus 200, method, and computer program product according to an example embodiment. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 226 of an apparatus 200 employing an embodiment of the present disclosure and executed by a processor 220 of the apparatus 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe certain example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A resource adequacy intelligence system comprising at least one processor and at least one memory including computer program code, the at least one memory and the computer program code configured to, with the at least one processor, cause the resource adequacy intelligence system to perform resource adequacy analytics of a first organization by:

generating, by an assumptions engine of the resource adequacy intelligence system, a model of the first organization using assumption data associated with the first organization, wherein the assumption data is configured via at least a user interface and comprises data defining at least an expected time to maturity of the first organization and respective quantifiable target developments in at least one metric of the first organization;

determining, by a resource adequacy analytics engine of the resource adequacy intelligence system and based on the model of the first organization, target values of one or more selected metrics of the at least one metric of the first organization, wherein the target values are variable over a period of time based on the expected time to maturity of the first organization;

leveraging, by a configuration engine of the resource adequacy intelligence system, one or more integrating systems integrated with the resource adequacy intelligence system by continuously ingesting actual values of the one or more selected metrics from the one or more integrating systems in communication with the resource adequacy intelligence system, wherein the one or more integrating systems transmit data configured in respective formats used by the one or more integrating systems that are different from a standard data format used by the resource adequacy intelligence system;

applying, by the configuration engine, one or more transformations to the data configured in respective formats continuously ingested from the one or more integrating systems to iteratively create actual value data sets having the standard data format used by the resource adequacy intelligence system;

generating, by the resource adequacy analytics engine of the resource adequacy intelligence system and as part of performing the resource adequacy analytics of the first organization, resource adequacy intelligence information by monitoring at least one of the actual values within the actual value data sets or predicted values of the one or more selected metrics relative to the model over the period of time; and using, by the resource adequacy analytics engine, the resource adequacy intelligence information to ensure that the first organization reaches maturity within the expected time to maturity of the first organization, wherein monitoring the at least one of the actual values within the actual value data sets or the predicted values of the one or more selected metrics further comprises:

accessing respective actual values of the one or more selected metrics associated with the first organization, wherein the respective actual values of the one or more selected metrics change over the period of time;

in an instance the predicted values are monitored, updating a neural network, by the resource adequacy intelligence system and using the actual value data sets, to generate the predicted values and to obtain an updated neural network;

comparing, at least at a plurality of times over the period of time, at least one of the target values of the one or more selected metrics reflected in the model to the respective actual values or the predicted values associated with the first organization;

determining, based on the comparison, that an alert condition of at least one of the one or more selected metrics is satisfied; and in response to determining the alert condition is satisfied, generating an alert to be provided via the user interface or another user interface, wherein the at least one memory and the computer program code are further configured to, with the at least one processor, cause the resource adequacy intelligence system to perform the resource adequacy analytics of the first organization by at least:

creating an updated model of the model of the first organization using the updated neural network and through application of machine learning techniques, wherein the updated model is created based on, in addition to the assumption data of the first organization, (a) other target values of the one or more selected metrics relating to a different organization, and (b) the actual values of respective one or more selected metrics relating to the different organization, and wherein the updated model provides a change in at least one of the predicted values of the one or more selected metrics of the first organization.

2. The resource adequacy intelligence system of claim 1, wherein the actual values comprise at least human resource capacity information, and wherein the at least one memory and the computer program code are further configured to, with the at least one processor, cause the resource adequacy intelligence system to at least:

facilitate change management procedures to cause the human resource capacity information to change over the period of time.

3. The resource adequacy intelligence system of claim 1, wherein the first organization is associated with a parent organization, and wherein the at least one memory and the computer program code are further configured to, with the at least one processor, cause the resource adequacy intelligence system to at least:

model and monitor the parent organization, and in response to the monitoring, generate an alert caused by a plurality of respective changes in actual values or predicted values relating to the first organization and a plurality of other organizations associated with the parent organization.

4. The resource adequacy intelligence system of claim 3, wherein each of the respective changes in the actual values do not cause an individual alert to be generated for at least one of the first organization or one of the plurality of other organizations, but the changes in the actual values for the parent organization cause the alert to be generated.

5. The resource adequacy intelligence system of claim 1, wherein the at least one memory and the computer program code are further configured to, with the at least one processor, cause the resource adequacy intelligence system to at least:

generate a first data structure representative of a first staffing pyramid of the first organization;

generate a second data structure representative of a second staffing pyramid of a second organization; and identify differences between the first staffing pyramid and the second staffing pyramid by comparing the first data structure and the second data structure.

6. The resource adequacy intelligence system of claim 1, wherein the at least one memory and the computer program code are further configured to, with the at least one processor, cause the resource adequacy intelligence system to at least:

analyze at least one model to determine future workforce needs of a parent organization.

7. The resource adequacy intelligence system of claim 1, wherein the at least one memory and the computer program code are further configured to, with the at least one processor, cause the resource adequacy intelligence system to at least:

analyze at least one model to determine location intelligence information of a parent organization.

8. The resource adequacy intelligence system of claim 1, wherein the at least one memory and the computer program code are further configured to, with the at least one processor, cause the resource adequacy intelligence system to at least:

analyze at least one model to determine future real estate needs of a parent organization.

9. The resource adequacy intelligence system of claim 1, wherein the at least one memory and the computer program code are further configured to, with the at least one processor, cause the resource adequacy intelligence system to at least:

receive at least a portion of the actual values of the one or more selected metrics from an issues management system.

10. The resource adequacy intelligence system of claim 1, wherein the at least one memory and the computer program code are further configured to, with the at least one processor, cause the resource adequacy intelligence system to at least:

receive at least a portion of the actual values of the one or more selected metrics from a human resources system.

11. The resource adequacy intelligence system of claim 1, wherein the at least one memory and the computer program code are further configured to, with the at least one processor, cause the resource adequacy intelligence system to at least:

receive at least a portion of the actual values of the one or more selected metrics from a technology resources system.

12. The resource adequacy intelligence system of claim 1, wherein the at least one memory and the computer program code are further configured to, with the at least one processor, cause the resource adequacy intelligence system to at least:

receive at least a portion of the actual values of the one or more selected metrics from a real estate management system.

13. A method for performing resource adequacy analytics of a first organization that is configured to be executed by a processor of a resource adequacy intelligence system, the method comprising:

generating, by an assumptions engine of the resource adequacy intelligence system, a model of the first organization using assumption data associated with the first organization, wherein the assumption data is configured via at least a user interface and comprises data defining at least an expected time to maturity of the first organization and respective quantifiable target developments in at least one metric of the first organization;

determining, by a resource adequacy analytics engine of the resource adequacy intelligence system and based on the model of the first organization, target values of one or more selected metrics of the at least one metric of the first organization, wherein the target values are variable over a period of time based on the expected time to maturity of the first organization;

leveraging, by a configuration engine of the resource adequacy intelligence system, one or more integrating systems integrated with the resource adequacy intelligence system by continuously ingesting actual values of the one or more selected metrics from one or more integrating systems in communication with the resource adequacy intelligence system, wherein the one or more integrating systems transmit data configured in respective formats used by the one or more integrating systems that are different from a standard data format used by the resource adequacy intelligence system;

applying, by the configuration engine, one or more transformations to the data configured in respective formats ingested from the one or more integrating systems to iteratively create actual value data sets having the standard data format used by the resource adequacy intelligence system;

generating, by the resource adequacy analytics engine of the resource adequacy intelligence system and as part of performing the resource adequacy analytics of the first organization, resource adequacy intelligence information by monitoring at least one of the actual values within the actual value data sets or predicted values of the one or more selected metrics relative to the model over the period of time; and using, by the resource adequacy analytics engine, the resource adequacy intelligence information to ensure that the first organization reaches maturity within the expected time to maturity of the first organization, wherein monitoring the at least on the actual values within the actual value data sets or the predicted values of the one or more selected metrics further comprises:

accessing respective actual values of the one or more selected metrics associated with the first organization, wherein the respective actual values of the one or more selected metrics change over the period of time;

in an instance the predicted values are monitored, updating a neural network, by the resource adequacy intelligence system and using the actual value data sets, to generate the predicted values and to obtain an updated neural network;

comparing, at least at a plurality of times over the period of time, at least one of the target values of the one or more selected metrics reflected in the model to the respective actual values or the predicted values associated with the first organization;

determining based on the comparison, that an alert condition of at least one of the one or more selected metrics is satisfied; and in response to determining the alert condition is satisfied, generating an alert to be provided via the user interface or another user interface, wherein the method further comprises causing the resource adequacy intelligence system to perform the resource adequacy analytics of the first organization by at least:

creating an updated model of the model of the first organization using the updated neural network and through application of machine learning techniques, wherein the updated model is created based on, in addition to the assumption data of the first organization, (a) other target values of the one or more selected metrics relating to a different organization, and (b) the actual values of respective one or more selected metrics relating to the different organization, and wherein the updated model provides a change in at least one of the predicted values of the one or more selected metrics of the first organization.

14. The method according to claim 13, wherein the first organization is associated with a parent organization, and the method further comprises:

modeling and monitoring the parent organization, and in response to the monitoring, generate an alert caused by a plurality of respective changes in actual values or predicted values relating to the first organization and a plurality of other organizations associated with the parent organization.

15. The method according to claim 14, wherein each of the respective changes in the actual values do not cause an individual alert to be generated for at least one of the first organization or one of the plurality of other organizations, but the changes in the actual values for the parent organization cause the alert to be generated.

16. The method according to claim 13, further comprising:

analyzing at least one model to determine future workforce needs of a parent organization.

17. The method according to claim 13, further comprising:

analyzing at least one model to determine location intelligence information of a parent organization.

18. A computer program product comprising at least one non-transitory computer-readable medium having computer-readable program instructions stored therein, the computer-readable program instructions comprising instructions, which when performed by a resource adequacy intelligence system, are configured to cause the resource adequacy intelligence system to perform resource adequacy analytics of a first organization by:

generating, by an assumptions engine of the resource adequacy intelligence system, a model of the first organization using assumption data associated with the first organization, wherein the assumption data is configured via at least a user interface and comprises data defining at least an expected time to maturity of the first organization and respective quantifiable target developments in at least one metric of the first organization;

determining, by a resource adequacy analytics engine of the resource adequacy intelligence system and based on the model of the first organization, target values of one or more selected metrics of the at least one metric of the first organization, wherein the target values are variable over a period of time based on the expected time to maturity of the first organization;

leveraging, by a configuration engine of the resource adequacy intelligence system, one or more integrating systems integrated with the resource adequacy intelligence system by continuously ingesting actual values of the one or more selected metrics from the one or more integrating systems in communication with the resource adequacy intelligence system, wherein the one or more integrating systems transmit data configured in respective formats used by the one or more integrating systems that are different from a standard data format used by the resource adequacy intelligence system;

applying, by the configuration engine, one or more transformations to the data configured in respective formats continuously ingested from the one or more integrating systems to iteratively create actual value data sets having the standard data format used by the resource adequacy intelligence system;

generating, by the resource adequacy analytics engine of the resource adequacy intelligence system and as part of performing the resource adequacy analytics of the first organization, resource adequacy intelligence information by monitoring at least one of the actual values within the actual value data sets or predicted values of the one or more selected metrics relative to the model over the period of time; and using, by the resource adequacy analytics engine, the resource adequacy intelligence information to ensure that the first organization reaches maturity within the expected time to maturity of the first organization, wherein monitoring the at least one of the actual values within the actual value data sets or the predicted values of the one or more selected metrics further comprises:

accessing respective actual values of the one or more selected metrics associated with the first organization, wherein the respective actual values of the one or more selected metrics change over the period of time;

in an instance the predicted values are monitored, updating a neural network, by the resource adequacy intelligence system and using the actual value data sets, to generate the predicted values and to obtain an updated neural network;

comparing, at least at a plurality of times over the period of time, at least one of the target values of the one or more selected metrics reflected in the model to the respective actual values or the predicted values associated with the first organization;

determining based on the comparison, that an alert condition of at least one of the one or more selected metrics is satisfied; and in response to determining the alert condition is satisfied, generating an alert to be provided via the user interface or another user interface, wherein the resource adequacy intelligence system is further caused to perform the resource adequacy analytics of the first organization by at least:

creating an updated model of the model of the first organization using the updated neural network and through application of machine learning techniques, wherein the updated model is created based on, in addition to the assumption data of the first organization, (a) other target values of the one or more selected metrics relating to a different organization, and (b) the actual values of respective one or more selected metrics relating to the different organization, and wherein the updated model provides a change in at least one of the predicted values of the one or more selected metrics of the first organization.

19. The computer program product of claim 18, wherein the resource adequacy intelligence system is further caused to perform the resource adequacy analytics of the first organization by:

analyze at least one model to determine future workforce needs of a parent organization.

20. The computer program product of claim 18, wherein the resource adequacy intelligence system is further caused to perform the resource adequacy analytics of the first organization by:

analyze at least one model to determine location intelligence information of a parent organization.

* * * * *